(12) United States Patent
Shi et al.

(10) Patent No.: US 10,460,039 B2
(45) Date of Patent: Oct. 29, 2019

(54) METHOD FOR CONTROLLING IDENTIFICATION AND IDENTIFICATION CONTROL APPARATUS

(71) Applicant: Panasonic Intellectual Property Management Co., Ltd., Osaka (JP)

(72) Inventors: Hongjie Shi, Tokyo (JP); Takashi Ushio, Tokyo (JP); Mitsuru Endo, Tokyo (JP); Katsuyoshi Yamagami, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 214 days.

(21) Appl. No.: 15/662,628

(22) Filed: Jul. 28, 2017

(65) Prior Publication Data
US 2018/0046619 A1    Feb. 15, 2018

Related U.S. Application Data

(60) Provisional application No. 62/372,456, filed on Aug. 9, 2016.

(30) Foreign Application Priority Data

Mar. 30, 2017 (JP) ................. 2017-067775

(51) Int. Cl.
*G06F 17/28* (2006.01)
*G06F 3/02* (2006.01)
(Continued)

(52) U.S. Cl.
CPC ............ *G06F 17/2836* (2013.01); *G06F 3/02* (2013.01); *G06F 17/2827* (2013.01);
(Continued)

(58) Field of Classification Search
CPC ............ G06F 17/28; G06N 3/02; G06N 3/04
See application file for complete search history.

(56) References Cited

U.S. PATENT DOCUMENTS

2015/0095033 A1* 4/2015 Boies ................. G06F 16/3329
704/257
2015/0363393 A1* 12/2015 Williams .............. G06F 17/289
704/8
(Continued)

OTHER PUBLICATIONS

Wan, "Co-training for cross-lingual sentiment classification." Proceedings of the Joint Conference of the 47th Annual Meeting of the ACL and the 4th International Joint Conference on Natural Language Processing of the AFNLP: vol. 1—vol. 1. Association for Computational Linguistics (Year: 2009).*

(Continued)

*Primary Examiner* — Samuel G Neway
(74) *Attorney, Agent, or Firm* — Greenblum & Bernstein, P.L.C.

(57) ABSTRACT

A method for controlling identification includes obtaining first text, which is text in a first language, obtaining second text, which is text in a second language obtained by translating the first text into the second language, obtaining correct labels, which indicate content of the first text, inputting the first text and the second text to an identification model common to the first and second languages, and updating the common identification model such that labels identified by the common identification model from the first text and the second text match the correct labels.

18 Claims, 18 Drawing Sheets

(51) Int. Cl.
　　　G06N 3/04　　　(2006.01)
　　　G10L 15/16　　(2006.01)
　　　G06N 3/08　　　(2006.01)
　　　G06F 17/27　　(2006.01)
(52) U.S. Cl.
　　　CPC ......... *G06N 3/0427* (2013.01); *G06N 3/0445* (2013.01); *G06N 3/0454* (2013.01); *G06N 3/084* (2013.01); *G10L 15/16* (2013.01); *G06F 17/2785* (2013.01)

(56) References Cited

U.S. PATENT DOCUMENTS

| | | | |
|---|---|---|---|
| 2016/0019290 A1* | 1/2016 | Ratnaparkhi | G06F 16/3329 707/743 |
| 2016/0322050 A1* | 11/2016 | Wang | G10L 15/22 |
| 2016/0350289 A1* | 12/2016 | Zhao | G06F 16/3337 |
| 2017/0084269 A1* | 3/2017 | Shi | G10L 15/16 |
| 2017/0091171 A1* | 3/2017 | Perez | G10L 15/22 |
| 2017/0228366 A1* | 8/2017 | Bui | G06F 17/279 |
| 2018/0046619 A1* | 2/2018 | Shi | G06F 17/2836 |

OTHER PUBLICATIONS

The Extended European Search Report, dated Jan. 5, 2018 from the European Patent Office (EPO), for the related European Patent Application No. 17182712.4.
Hongjie Shi, et al.: "A Multichannel Convolutional Neural Network for Cross-Language Dialog State Tracking", 2016 IEEE Spoken Language Technology Workshop (SLT), Dec. 13-16, 2016, pp. 559-564, XP033061792.
Yoon Kim, "Convolutional Neural Networks for Sentence Classification", Proceedings of the 2014 Conference on EMNLP, pp. 1746-1751, Oct. 2014.
J. Scott McCarley, "Should We Translate the Documents or the Queries in Cross-language Information Retrieval?", ACL'99 Proceedings of the 37th Annual Meeting of the Association for Computational Linguistics on Computational Linguistics, Association for Computational Linguistics, Jun. 20, 1999, pp. 208-214.
Yuhong Guo et al., "Cross Language Text Classification via Subspace Co-Regularized Multi-View Learning", the 29th International Conference on Machine Learning (ICML 2012), Jun. 27, 2012.

* cited by examiner

FIG. 12

| TOPIC | SLOT |
|---|---|
| Food | INFO, CUISINE, TYPE OF PLACE, DRINK, PLACE, MEAL TIME, DISH, NEIGHBOURHOOD |
| Attraction | INFO, TYPE OF PLACE, ACTIVITY, PLACE, TIME, NEIGHBOURHOOD |
| Shopping | INFO, TYPE OF PLACE, PLACE, NEIGHBOURHOOD, TIME |
| Transportation | INFO, FROM, TO, STATION, LINE, TYPE, TICKET |
| Accommodation | INFO, TYPE OF PLACE, PLACE, NEIGHBOURHOOD |

FIG. 13

| DIALOG SEGMENT | DIALOG STATE |
|---|---|
| Guide: Let's try this one, okay?<br>Tourist: Okay.<br>Guide: It's InnCrowd Backpackers Hostel in Singapore. If you take a dorm bed per person only twenty dollars. If you take a room, it's two single beds at fifty nine dollars.<br>Tourist: Um. Wow, that's good.<br>Guide: Yah, the prices are based on per person per bed or dorm. But this one is room. So it should be fifty nine for the two room. So you're actually paying about ten dollars more per person only.<br>Tourist: Oh okay. That's the price is reasonable actually. It's good. | INFO:<br>Pricerange<br><br>PLACE:<br>InnCrowd Backpackers Hostel |

FIG. 18

| TEAM | ENTRY | CORRECT ANSWER RATE | MATCHING RATE | REPRODUCTION RATE | F-MEASURE |
|---|---|---|---|---|---|
| 2 | 3 | 0.0956 | 0.5643 | 0.3769 | 0.4519 |
| 2 | 4 | 0.0872 | 0.5427 | 0.3842 | 0.4499 |
| 2 | 0 | 0.0964 | 0.5217 | 0.3849 | 0.4430 |
| 2 | 1 | 0.0712 | 0.4340 | 0.4196 | 0.4267 |
| 2 | 2 | 0.0681 | 0.4216 | 0.4303 | 0.4259 |
| 4 | 2 | 0.0635 | 0.3768 | 0.4140 | 0.3945 |
| 1 | 4 | 0.0612 | 0.3811 | 0.3548 | 0.3675 |
| 6 | 1 | 0.0383 | 0.4063 | 0.3124 | 0.3532 |
| 5 | 0 | 0.0520 | 0.3637 | 0.3044 | 0.3314 |
| ADDITIONAL EXPERIMENTS | 5 | 0.0949 | 0.5786 | 0.3689 | 0.4505 |
| | 6 | 0.0888 | 0.5677 | 0.3712 | 0.4489 |

FIG. 19

| ENTRY | DROPOUT RATE | No. OF FILTERS OF EACH CHANNEL | LEARNING RATE | L2 NORMALIZATION LOAD ATTENUATION COEFFICIENT |
|---|---|---|---|---|
| 0 | 0.6 | 1000 | 0.001 | 0.0005 |
| 1 | 0.8 | 1400 | | |
| 2 | 0.8 | 1000 | | |
| 3 | 0.4 | 1000 | | |
| 4 | 0.5 | 600 | | |
| 5 | 0.2 | 1000 | | |
| 6 | 0 | 1000 | | |

FIG. 21

| DIALOG SEGMENT (TRANSLATION) | CHINESE CHARACTER MODEL | CHINESE WORD MODEL | ENGLISH MODEL | COMBINATION MODEL | MULTICHANNEL MODEL |
|---|---|---|---|---|---|
| Guide:<br>你就可以步行到我们的植物园去散步。(you can walk to the botanical garden where we go for a walk.)<br>或者赏花。(or the flowers.)<br>Tourist:<br>呃。(er.)<br>呃植物。(er, plants.) | PLACE:<br>Singapore Botanic Gardens | INFO:<br>Exhibit<br>PLACE:<br>Singapore Botanic Gardens, Bukit Timah Nature Reserve, Hort Park, National Orchid Garden | INFO:<br>Exhibit<br>PLACE:<br>Singapore Botanic Gardens, Bukit Timah Nature Reserve, Orchard Road, National Orchid Garden<br>ACTIVITY:<br>Walking | INFO:<br>Exhibit<br>PLACE:<br>Singapore Botanic Gardens, National Orchid Garden | PLACE:<br>Singapore Botanic Gardens<br>ACTIVITY:<br>Walking<br>= CORRECT LABELS |

METHOD FOR CONTROLLING IDENTIFICATION AND IDENTIFICATION CONTROL APPARATUS

BACKGROUND

1. Technical Field

The present disclosure relates to a method for controlling identification and the like for identifying labels representing the content of text.

2. Description of the Related Art

In J. Scott McCarley, "Should We Translate the Documents or the Queries in Cross-language Information Retrieval?", ACL '99 Proceedings of the 37th Annual Meeting of the Association for Computational Linguistics on Computational Linguistics, Association for Computational Linguistics, Jun. 20, 1999, pp. 208-214, a hybrid system has been proposed in which translation of both documents and queries is employed for cross-language information retrieval. In Yuhong Guo and Min Xiao, "Cross Language Text Classification via Subspace Co-Regularized Multi-View Learning", the 29th International Conference on Machine Learning (ICML 2012), Jun. 27, 2012, it has been proposed that two different classifiers are trained through machine translation for cross-language text classification.

SUMMARY

In one general aspect, the techniques disclosed here feature a method for controlling identification. The method includes obtaining first text, which is text in a first language, obtaining second text, which is text in a second language obtained by translating the first text into the second language, obtaining correct labels, which indicate content of the first text, inputting the first text and the second text to an identification model common to the first and second languages, and updating the common identification model such that labels identified by the common identification model from the first text and the second text match the correct labels.

With the method for controlling identification and the like according to an aspect of the present disclosure, labels representing the content of text can be appropriately identified in an environment in which a plurality of languages are used.

It should be noted that general or specific embodiments may be implemented as a system, an apparatus, a method, an integrated circuit, a computer program, a computer-readable non-transitory recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a data table indicating topics and slots relating to dialog segments in an evaluation example;

FIG. 13 is a data table indicating a dialog segment and a dialog state in the evaluation example;

FIG. 18 is a data table indicating evaluation results in the evaluation example;

FIG. 19 is a data table indicating hyperparameters in the evaluation example;

FIG. 21 is a data table indicating labels estimated by the models used in the evaluation example.

DETAILED DESCRIPTION

Underlying Knowledge Forming Basis of Present Disclosure

The present inventors have identified a problem in a method for controlling identification and the like for identifying labels representing the content of text. The problem will be specifically described hereinafter.

Figure 1:
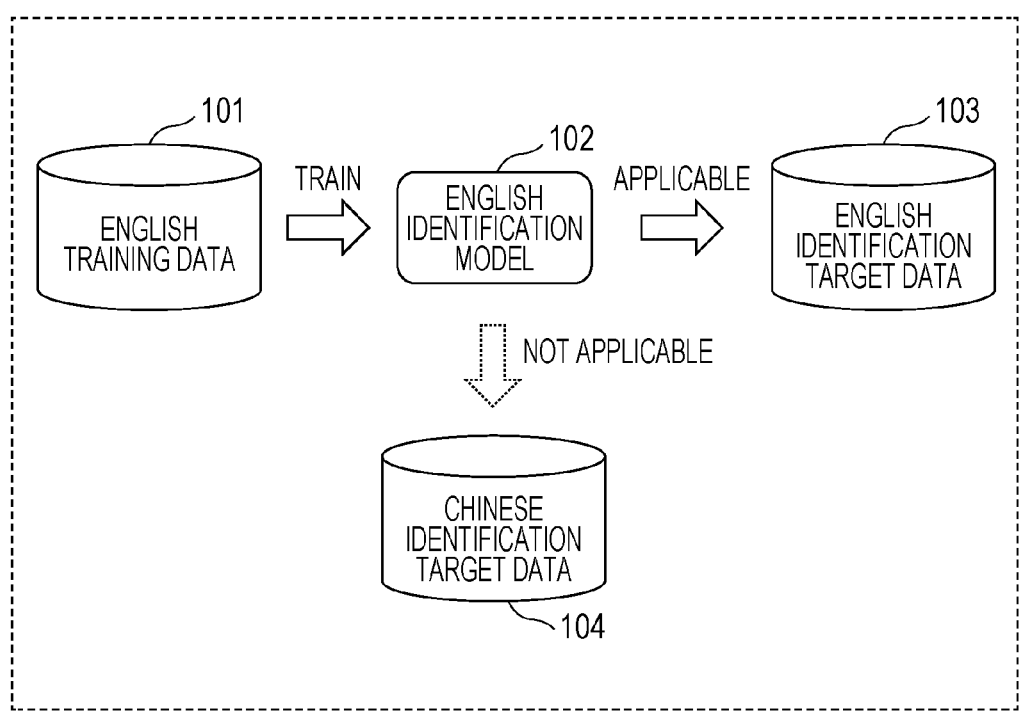
FIG. 1 is a schematic diagram illustrating an English identification model in a reference example.

FIG. 1 is a schematic diagram illustrating an English identification model 102 in a reference example. The English identification model 102 illustrated in FIG. 1 is a model for identifying labels representing the content of English text and, for example, is a neural network model.

Here, a neural network model is a mathematical model that imitates a nerve net of an organism. The neural network model includes a plurality of nodes, which are also called "neurons". Joint strengths called "weights" are set between the nodes as parameters. Labels representing the content of information input to the neural network model can be identified in accordance with the nodes and the weights between the nodes. In the neural network model, the weights are updated through training to improve identification performance.

The English identification model 102 is trained by English training data 101. More specifically, the English training data 101 includes English text and labels representing the content of the text. The labels included in the English training data 101 are also called "correct labels" or "teacher labels". The English identification model 102 is then updated such that labels identified by the English identification model 102 from the English text included in the English training data 101 match the correct labels. The English identification model 102 is thus trained.

The English identification model 102 can be applied to English identification target data 103, but cannot be applied to Chinese identification target data 104.

More specifically, the English identification target data 103 includes English text. The English identification model 102 obtains appropriate labels from the English text included in the English identification target data 103. The Chinese identification target data 104, on the other hand, includes Chinese text. The English identification model 102 cannot obtain appropriate labels from the Chinese text included in the Chinese identification target data 104.

Figure 2:
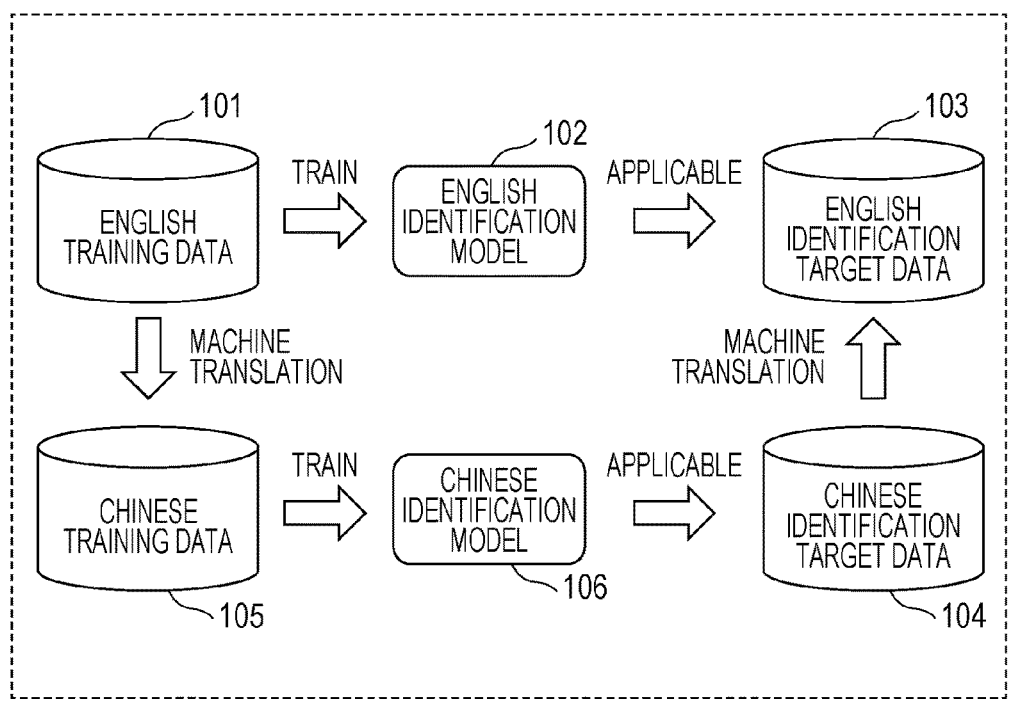
FIG. 2 is a schematic diagram illustrating a method for identifying labels representing the content of Chinese text using the English identification model or English training data in the reference example.

FIG. 2 is a schematic diagram illustrating a method for identifying labels representing the content of the Chinese text included in the Chinese identification target data 104 using the English identification model 102 or the English training data 101 in the reference example.

For example, the Chinese identification target data 104 is subjected to machine translation and translated into the English identification target data 103. More specifically, the Chinese text included in the Chinese identification target data 104 is subjected to machine translation and translated into English text to construct the English identification target data 103 including the English text. The English identification model 102 can be applied to the obtained English identification target data 103.

Alternatively, the English training data 101 is subjected to machine translation and translated into Chinese training data 105. More specifically, the English text included in the English training data 101 is subjected to machine translation and translated into Chinese text to construct the Chinese training data 105 including the Chinese text and labels representing the content of the Chinese text. Labels representing the content of text are expressed in values or the like regardless of the language.

A Chinese identification model 106 is trained by the obtained Chinese training data 105. That is, the Chinese identification model 106 is constructed by the obtained Chinese training data 105. The constructed Chinese identification model 106 can be applied to the Chinese identification target data 104.

That is, there are two methods, namely the method for translating the Chinese identification target data 104 into the English identification target data 103 through machine translation and the method for constructing the Chinese identification model 106 by translating the English training data 101 into the Chinese training data 105 through machine translation.

These two methods may be combined with each other. That is, labels representing the content of the Chinese text included in the Chinese identification target data 104 may be identified by each of the two methods. Final labels representing the content of the Chinese text may then be identified by combining the labels identified by the two methods or picking and choosing from among the labels identified by the two methods.

Such combination of two methods is similar to the hybrid system described in J. Scott McCarley, "Should We Translate the Documents or the Queries in Cross-language Information Retrieval?", ACL '99 Proceedings of the 37th Annual Meeting of the Association for Computational Linguistics on Computational Linguistics, Association for Computational Linguistics, Jun. 20, 1999, pp. 208-214. In addition, such combination of two methods is similar to the technique described in Yuhong Guo and Min Xiao, "Cross Language Text Classification via Subspace Co-Regularized Multi-View Learning", the 29th International Conference on Machine Learning (ICML 2012), Jun. 27, 2012 in terms of use of two models such as the English identification model 102 and the Chinese identification model 106.

Because the English identification target data 103 and the Chinese training data 105, which are obtained as a result of machine translation, include errors due to a low quality of the machine translation, however, a sufficient label identification quality might not be achieved.

In particular, the quality of machine translation with respect to a plurality of languages is not yet high enough despite the ongoing globalization. It is therefore difficult to appropriately identify labels representing the content of text in an environment in which a plurality of languages are used.

The present disclosure provides a method for controlling identification and the like for appropriately identifying labels representing the content of text in an environment in which a plurality of languages are used.

A method for controlling identification according to an aspect of the present disclosure includes obtaining first text, which is text in a first language, obtaining second text, which is text in a second language obtained by translating the first text into the second language, obtaining correct labels, which indicate content of the first text, inputting the first text and the second text to an identification model common to the first and second languages, and updating the common identification model such that labels identified by the common identification model from the first text and the second text match the correct labels.

As a result, both the first text in the first language and the second text in the second language are input to the common identification model. The common identification model is then updated such that the common identification model identifies appropriate labels. That is, an identification model based on a plurality of languages capable of identifying appropriate labels from a plurality of sets of text in the plurality of languages is constructed.

The identification model based on the plurality of languages is appropriately trained in a cross-language manner. The identification model based on the plurality of languages, therefore, can identify labels more appropriately than an identification model based on a single language or a combination of identification models based on a single language. Labels representing the content of text can therefore be appropriately identified in an environment in which a plurality of languages are used. That is, label identification quality improves in an environment in which a plurality of languages are used.

For example, the method may further include converting the first text into a first value string using a first conversion model, which converts a plurality of elements expressed in the first language into a plurality of close values when the plurality of elements are semantically close to one another, and converting the second text into a second value string using a second conversion model, which converts a plurality of elements expressed in the second language into a plurality of close values when the plurality of elements are semantically close to one another. In the inputting the first text and the second text to the identification model common to the first and second languages, the first text converted into the first value string and the second text converted into the second value string may be input to the common identification model.

As a result, the conversion model based on meanings of elements expressed in each language can convert the corresponding text into a value string and input the text converted into the value string to the common identification model.

In addition, for example, the first conversion model may convert the plurality of elements expressed in the first language into a plurality of close vectors when the plurality of elements are semantically close to one another. The second conversion model may convert the plurality of elements expressed in the second language into a plurality of close vectors when the plurality of elements are semantically close to one another. The first value string may be a first vector string. The second value string may be a second vector string.

As a result, the conversion model based on the meanings of the elements expressed in each language can convert the corresponding text into a vector string and input the text converted into the vector string to the common identification model.

In addition, for example, the common identification model may be a convolutional neural network model.

As a result, the convolutional neural network model is used as the identification model for identifying labels. The convolutional neural network model appropriately extracts features and identifies appropriate labels based on the extracted features. The appropriate labels can thus be identified.

In addition, for example, the convolutional neural network model may include a plurality of convolutional layers and a plurality of pooling layers alternately stacked on one another.

As a result, the convolutional neural network model in which a plurality of convolutional layers and a plurality of pooling layers are alternately stacked on one another is used as the identification model for identifying labels. The convolution neural network model in which the plurality of convolutional layers and the plurality of pooling layers are alternately stacked on one another extracts the features more appropriately through a plurality of feature extraction operations performed on input information. More appropriate labels can therefore be identified.

In addition, for example, the convolutional neural network model may separately include at least one convolutional layer corresponding to the first language and at least one convolutional layer corresponding to the second language.

As a result, the convolutional layer corresponding to each language can appropriately extract the features. That is, the feature of each language can be appropriately extracted.

In addition, for example, the convolutional neural network model may separately include at least one pooling layer corresponding to the first language and at least one pooling layer corresponding to the second language.

As a result, the pooling layer corresponding to each language can reduce dimensions of information indicating the features. That is, the dimensions can be reduced before the plurality of features corresponding to the plurality of languages are combined with each other. An increase in the amount of calculation can therefore be suppressed.

In addition, for example, the convolutional neural network model may include at least one pooling layer common to the first and second languages.

As a result, the plurality of features corresponding to the plurality of languages can be combined with each other. The plurality of features combined with each other can be used to identify labels.

In addition, for example, the convolutional neural network model may include at least one convolutional layer common to the first and second languages.

As a result, the at least one convolution layer common to the plurality of languages can extract the features. That is, the features can be extracted as a process common to the plurality of languages. An increase in the amount of calculation can therefore be suppressed.

In addition, for example, the common identification model may be a recurrent neural network model.

As a result, the recurrent neural network model, which is suitable for natural language processing, is used as the identification model for identifying labels. Labels representing the content of text can therefore be appropriately identified.

In addition, for example, the common identification model may include a first extraction layer in which a first feature, which is a feature of text in the first language, is extracted, a second extraction layer in which a second feature, which is a feature of text in the second language, is extracted, and a combining layer in which the first feature and the second feature are combined with each other.

As a result, the identification model including a plurality of extraction layers and a combining layer is used as the identification model for identifying labels. The identification model including these layers is trained as a whole. Labels can therefore be appropriately identified.

In addition, for example, in the combining layer, a plurality of values indicating the first and second features may be connected with each other.

As a result, the plurality of values indicating the plurality of features corresponding to the plurality of languages can be simply combined with each other. A result of the combining can then be used to identify labels.

In addition, for example, in the combining layer, a plurality of values indicating the first and second features may be subjected to linear connection.

As a result, the plurality of values indicating the plurality of features corresponding to the plurality of languages can be combined with each other through simple calculation. A result of the combining can then be used to identify labels.

In addition, for example, in the combining layer, a probability of each of a plurality of labels may be calculated through a process including combining and weighted addition of a plurality of values indicating the first and second features. The labels identified by the common identification model may be identified on the basis of the probabilities calculated in the combining layer.

As a result, final labels can be identified on the basis of the probabilities. In addition, the identification model for identifying final labels from the two sets of text in the two languages is trained. Final labels can therefore be appropriately identified.

In addition, for example, the method may further include obtaining third text, which is text in the first language, obtaining fourth text, which is text in the second language, either the third text or the fourth text being text obtained by translating the other text into the language corresponding to the foregoing text, inputting the third text and the fourth text to the updated common identification model, and identifying labels identified by the common identification model from the third text and the fourth text as labels representing the third text or the fourth text.

As a result, both the third text in the first language and the fourth text in the second language are input to the identification model based on the plurality of languages. The identification model based on the plurality of languages can identify labels more appropriately than an identification model based on a single language or a combination of identification models based on a single language. Labels can therefore be appropriately identified.

In addition, for example, the method may further include converting the third text into a third value string using a first conversion model, which converts a plurality of elements expressed in the first language into a plurality of close values when the plurality of elements are semantically close to one another, and converting the fourth text into a fourth value string using a second conversion model, which converts a plurality of elements expressed in the second language into a plurality of close values when the plurality of elements are semantically close to one another. In the inputting the third text and the fourth text to the updated common identification model, the third text converted into the third value string and the fourth text converted into the fourth value string may be input to the common identification model.

As a result, the conversion model based on meanings of elements expressed in each language can convert the corresponding text into a value string and input the text converted into the value string to the common identification model.

In addition, for example, the first conversion model may convert the plurality of elements expressed in the first language into a plurality of close vectors when the plurality of elements are semantically close to one another. The second conversion model may convert the plurality of elements expressed in the second language into a plurality of close vectors when the plurality of elements are semantically close to one another. The third value string may be a third vector string. The fourth value string may be a fourth vector string.

As a result, the conversion model based on the meanings of the elements expressed in each language can convert the corresponding text into a vector string and input the text converted into the vector string to the common identification model.

In addition, an identification control apparatus according to an aspect of the present disclosure includes a control circuit that executes a method for controlling identification, and a storage circuit that stores information used by the control circuit to execute the method for controlling identification. The method for controlling identification includes obtaining first text, which is text in a first language, obtaining second text, which is text in a second language obtained by translating the first text into the second language, obtaining correct labels, which indicate content of the first text, inputting the first text and the second text to an identification model common to the first and second languages, and updating the common identification model such that labels identified by the common identification model from the first text and the second text match the correct labels.

As a result, the identification control apparatus can execute the method for controlling identification. The identification control apparatus, therefore, can appropriately identify labels representing the content of text in an environment in which a plurality of languages are used.

It should be noted that these general or specific aspects may be implemented as a system, an apparatus, a method, an integrated circuit, a computer program, a computer-readable non-transitory recording medium such as a CD-ROM, or any selective combination thereof.

An embodiment will be specifically described hereinafter with reference to the drawings. The embodiment that will be described hereinafter is a general or specific example. Values, shapes, materials, components, arrangement positions and connection modes of the components, steps, the order of the steps, and the like mentioned in the following embodiment are examples, and do not limit the present disclosure. Among the components described in the following embodiment, ones not described in the independent claims, which define broadest concepts, will be described as arbitrary components.

Identification of labels can also be referred to as "estimation of labels", "pre-estimation of labels", "classification of labels", or the like. The term "identification" may therefore be replaced by "estimation", "pre-estimation", "classification", or the like.

Embodiment

Figure 3:
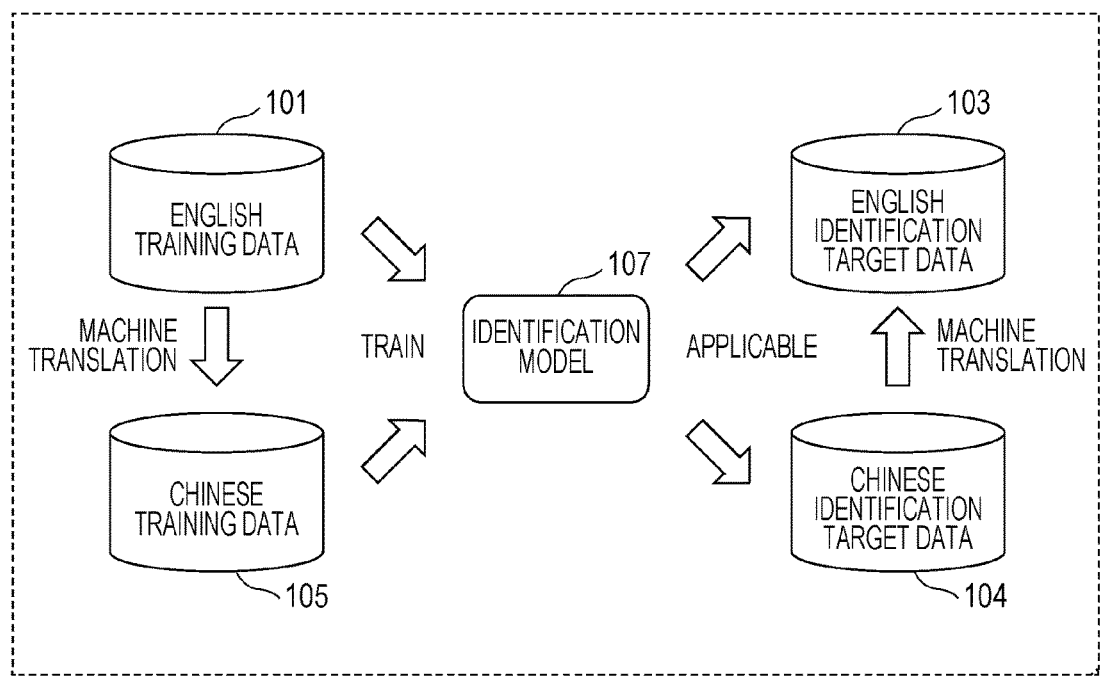
FIG. 3 is a schematic diagram illustrating an identification model according to an embodiment.

FIG. 3 is a schematic diagram illustrating an identification model 107 according to an embodiment. The identification model 107 illustrated in FIG. 3 is a model for identifying labels representing the content of text in a first language and the content of text in a second language on the basis of these two sets of text. The identification model 107 is, for example, a neural network model.

The identification model 107 may be a multilayer neural network model. Alternatively, the identification model 107 may be a convolutional neural network (CNN) model or a recurrent neural network (RNN) model.

Although a case in which the first language is English and the second language is Chinese will be described hereinafter, the first and second languages need not be English and Chinese.

The English training data 101, English identification target data 103, Chinese training data 105, and Chinese identification target data 104 illustrated in FIG. 3 are the same as those illustrated in FIG. 2. Training data will also be referred to as teacher data.

The identification model 107 is trained by the English training data 101 and the Chinese training data 105. More specifically, the English text included in the English training data 101 and the Chinese text included in the Chinese training data 105 are input to the identification model 107. The identification model 107 is then updated such that labels identified by the identification model 107 from the English text and the Chinese text match the correct labels. The identification model 107 is thus trained.

Since the identification model 107 is trained by the English training data 101 and the Chinese training data 105, the identification model 107 can be applied to the English identification target data 103 and the Chinese identification target data 104. That is, the identification model 107 identifies appropriate labels from the English text included in the English identification target data 103 and the Chinese text included in the Chinese identification target data 104.

Figure 4:
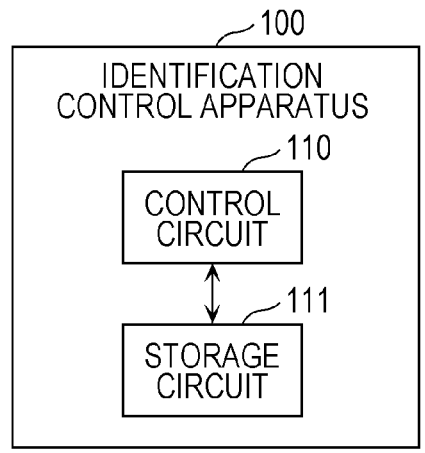
FIG. 4 is a block diagram illustrating the configuration of an identification control apparatus according to the embodiment.

FIG. 4 is a block diagram illustrating the configuration of an identification control apparatus 100 that employs the identification model 107 illustrated in FIG. 3. The identification control apparatus 100 illustrated in FIG. 4 includes a control circuit 110 and a storage circuit 111. The identification control apparatus 100 is, for example, a computer.

The control circuit 110 is a general-purpose or dedicated electrical circuit that processes information. The control circuit 110 may be a processor such as a central processing unit (CPU), instead. The control circuit 110 processes information to control the operation of the identification control apparatus 100. Operations performed by the control circuit 110 might be herein mentioned as operations performed by the identification control apparatus 100.

The control circuit 110 also executes a method for controlling identification to identify labels representing the content of text. More specifically, the control circuit 110 obtains text in the first language, text in the second language, and correct labels through an input/output circuit, which is not illustrated. The control circuit 110 then updates the identification model 107 such that labels identified by the identification model 107 from the text in the first language and the second language match the correct labels.

The control circuit 110 then outputs the labels identified by the updated identification model 107 from the two sets of text in the first and second languages through the input/output circuit.

The storage circuit 111 is a general-purpose or dedicated electrical circuit storing information used by the control circuit 110 to process information. The storage circuit 111 may be a volatile or nonvolatile memory. For example, the storage circuit 111 stores information used by the control circuit 110 to execute the method for controlling identification. The storage circuit 111 may store the identification model 107 or a program for executing the method for controlling identification.

In addition, in order to process information smoothly, the storage circuit 111 may temporarily store the two sets of text in the first and second languages, the correct labels, the labels identified by the identification model 107, and the like.

Figure 5:
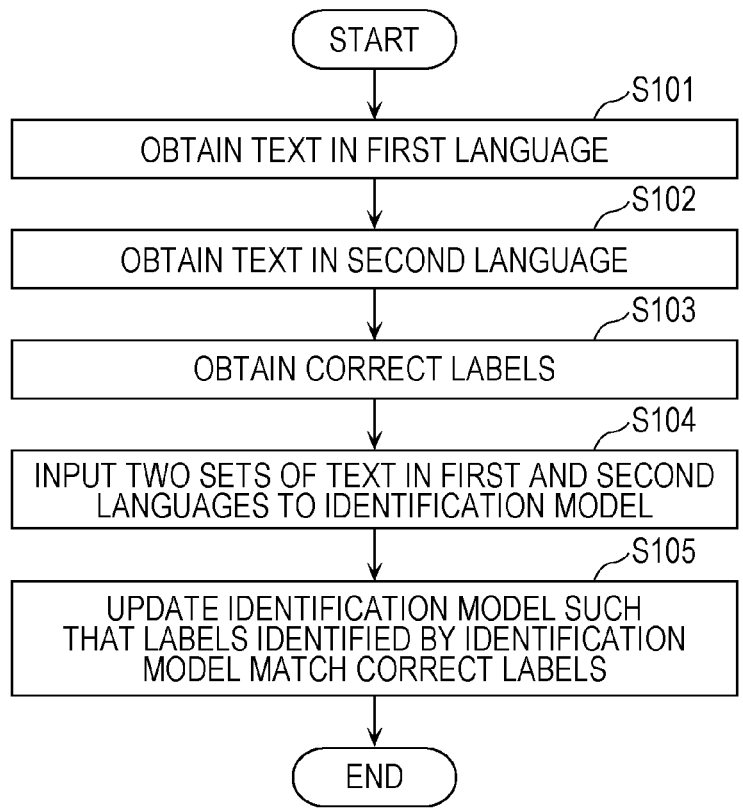
FIG. 5 is a flowchart illustrating a learning operation performed by the identification control apparatus according to the embodiment.

FIG. 5 is a flowchart illustrating a learning operation performed by the identification control apparatus 100 illustrated in FIG. 4. The identification control apparatus 100 illustrated in FIG. 4 updates the identification model 107 by performing the operation illustrated in FIG. 5.

First, the identification control apparatus 100 obtains text in the first language (S101). The text in the first language is expressed in the first language. The identification control apparatus 100 also obtains text in the second language (S102). The text in the second language is expressed in the second language.

Either the text in the first language or the text in the second language is obtained by performing machine translation on the other set of text. In other words, one of the two sets of text is text obtained by translating the other set of text, and the other set of text is original text that is not obtained by translating the one of the two sets of text.

The identification control apparatus 100 obtains correct labels (S103). The correct labels represent the content of text. More specifically, the correct labels represent the content of either the text in the first language or the text in the second language, whichever has been obtained without machine translation. That is, the correct labels represent the content of the original text, not the content of the text obtained by translating the other set of text. The correct labels, therefore, do not include errors caused by machine translation.

The identification control apparatus 100 may obtain the correct labels along with the original text, namely the text in the first language or the text in the second language. More specifically, the identification control apparatus 100 may obtain the correct labels attached to the original text.

Next, the identification control apparatus 100 inputs the two sets of text in the first and second languages to the identification model 107 (S104). The identification control apparatus 100 then updates the identification model 107 such that labels identified by the identification model 107 from the two sets of text in the first and second languages match the correct labels (S105).

If the identification model 107 is a neural network model, for example, the identification control apparatus 100 may update the identification model 107 through backpropagation. In this case, the identification control apparatus 100 may update the identification model 107 by updating parameters of the identification model 107, that is, weights between nodes.

The identification control apparatus 100 can thus train the identification model 107. That is, the identification control apparatus 100 is capable of making the identification model 107 learn.

Figure 6:
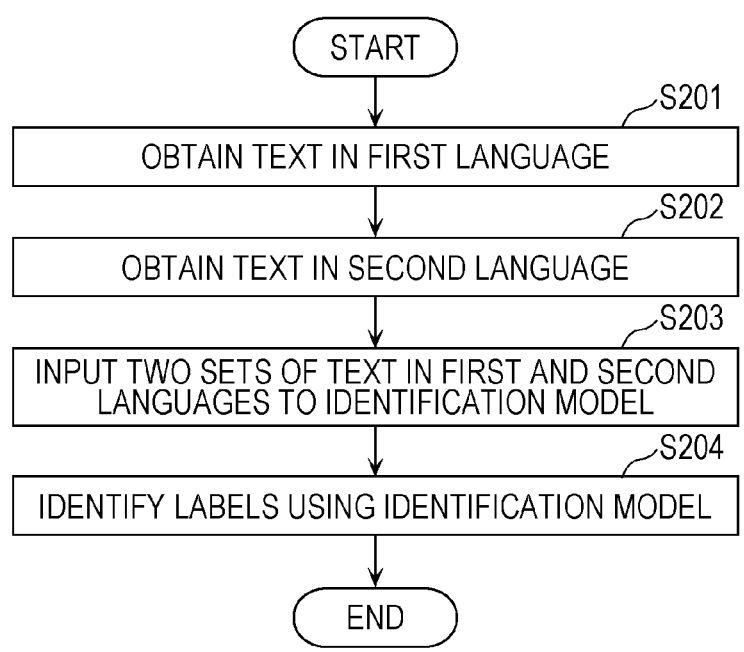
FIG. 6 is a flowchart illustrating an identification operation performed by the identification control apparatus according to the embodiment.

FIG. 6 is a flowchart illustrating an identification operation performed by the identification control apparatus 100 illustrated in FIG. 4. The identification control apparatus 100 illustrated in FIG. 4 identifies labels by performing the operation illustrated in FIG. 6.

First, the identification control apparatus 100 obtains the text in the first language (S201). The identification control apparatus 100 also obtains the text in the second language (S202).

Next, the identification control apparatus 100 inputs the two sets of text in the first and second languages to the updated identification model 107 (S203). The identification control apparatus 100 then identifies labels from the two sets of text in the first and second languages using the identification model 107 (S204).

The identification control apparatus 100 can thus identify appropriate labels using the updated identification model 107.

Figure 7:
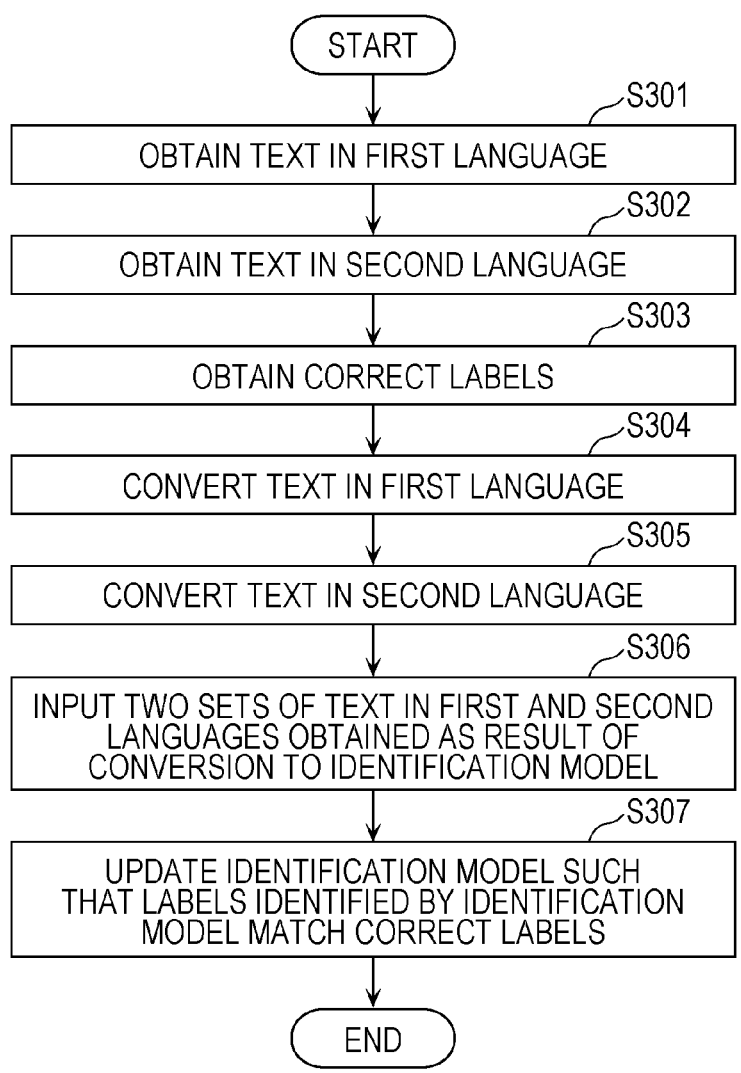
FIG. 7 is a flowchart illustrating a learning operation performed by the identification control apparatus according to a modification of the embodiment.

FIG. 7 is a flowchart illustrating a learning operation performed by the identification control apparatus 100 illustrated in FIG. 4 according to a modification. Obtaining steps (S301 to S303) illustrated in FIG. 7 are the same as the obtaining steps (S101 to S103) illustrated in FIG. 5.

In the modification illustrated in FIG. 7, the identification control apparatus 100 then converts the text in the first language (S304). More specifically, the identification control apparatus 100 converts the text in the first language into a value string using a first conversion model, which converts a plurality of elements expressed in the first language into a plurality of close values when the plurality of elements are semantically close to one another. Values may be set values, vector values, or matrix values.

For example, the first conversion model may convert the plurality of elements expressed in the first language into a plurality of close vectors when the plurality of elements are semantically close to one another. The identification control apparatus 100 may then convert the text in the first language into a vector string corresponding to the value string using the first conversion model.

Similarly, the identification control apparatus 100 converts the text in the second language (S305). More specifically, the identification control apparatus 100 converts the text in the second language into a value string using a second conversion model, which converts a plurality of elements expressed in the second language into a plurality of close values when the plurality of elements are semantically close to one another. Values may be set values, vector values, or matrix values.

For example, the second conversion model may convert the plurality of elements expressed in the second language into a plurality of close vectors when the plurality of elements are semantically close to one another. The identification control apparatus 100 may then convert the text in the second language into a vector string corresponding to the value string using the second conversion model.

Next, the identification control apparatus 100 inputs the two sets of text in the first and second languages obtained as a result of the conversion to the identification model 107 (S306). The identification control apparatus 100 then updates the identification model 107 such that labels identified by the identification model 107 from the two sets of text in the first and second languages match the correct labels (S307).

The identification control apparatus 100 can thus use, as an input to the identification model 107, the text obtained as a result of the conversion for making it easier to identify labels on the basis of meanings of the elements. The identification control apparatus 100, therefore, can train the identification model 107, that is, make the identification model 107 learn, in such a way as to identify labels more appropriately.

Figure 8:
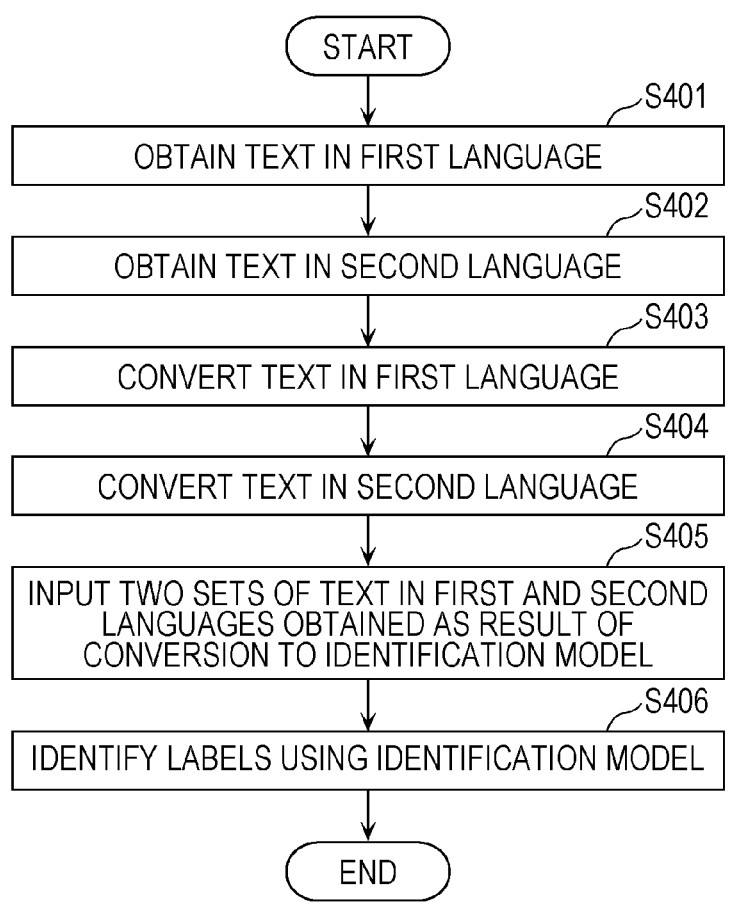
FIG. 8 is a flowchart illustrating an identification operation performed by the identification control apparatus according to a modification of the embodiment.

FIG. 8 is a flowchart illustrating an identification operation performed by the identification control apparatus 100 illustrated in FIG. 4 according to a modification. Obtaining steps (S401 and S402) illustrated in FIG. 8 are the same as the obtaining steps (S201 and S202) illustrated in FIG. 6.

In the modification illustrated in FIG. 8, the identification control apparatus 100 then converts the text in the first language (S403). More specifically, the identification control apparatus 100 converts the text in the first language into a value string using the first conversion model, which converts a plurality of elements expressed in the first language into a plurality of close values when the plurality of elements are semantically close to one another.

Similarly, the identification control apparatus 100 converts the text in the second language (S404). More specifically, the identification control apparatus 100 converts the text in the second language into a value string using the second conversion model, which converts a plurality of elements expressed in the second language into a plurality of close values when the plurality of elements are semantically close to one another.

Next, the identification control apparatus 100 inputs the two sets of text in the first and second languages obtained as a result of the conversion to the updated identification model 107 (S405). The identification control apparatus 100 then identifies labels from the two sets of text in the first and second languages using the updated identification model 107 (S406).

The identification control apparatus 100 can thus use, as an input to the identification model 107, the text obtained as a result of the conversion for making it easier to identify labels on the basis of meanings of the elements. The identification control apparatus 100, therefore, can identify labels more appropriately.

Figure 9:
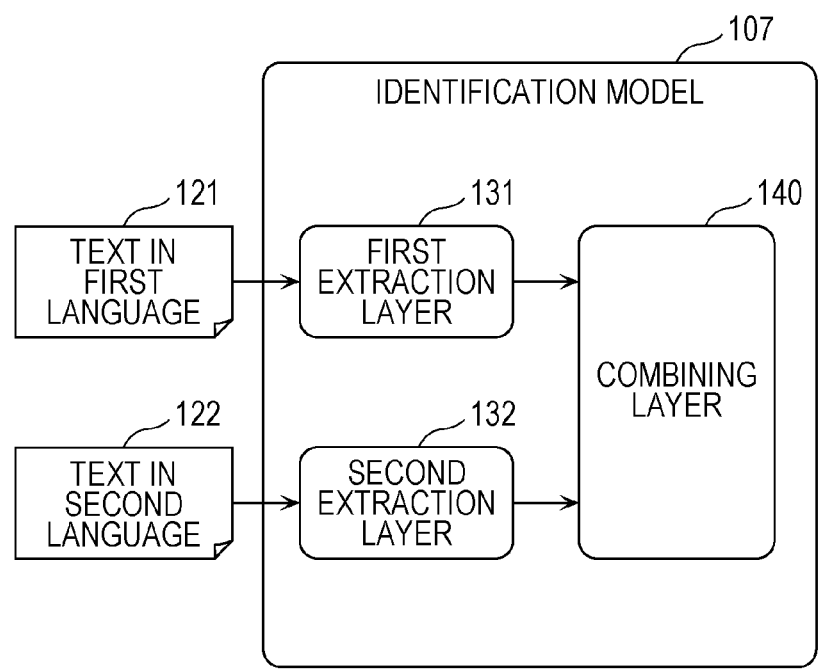
FIG. 9 is a schematic diagram illustrating a first example of the configuration of the identification model according to the embodiment.

FIG. 9 is a schematic diagram illustrating a first example of the configuration of the identification model 107 illustrated in FIG. 3. In the example illustrated in FIG. 9, the identification model 107 includes a first extraction layer 131, a second extraction layer 132, and a combining layer 140. The first extraction layer 131, the second extraction layer 132, and the combining layer 140 may each include a plurality of layers. That is, the first extraction layer 131, the second extraction layer 132, and the combining layer 140 may each be a group of one or more layers.

For example, the identification model 107 is a multilayer neural network model, and the first extraction layer 131, the second extraction layer 132, and the combining layer 140 correspond to one or more layers included in the multilayer neural network model.

In the first extraction layer 131, a first feature of text 121 in the first language is extracted. In the second extraction layer 132, a second feature of text 122 in the second language is extracted.

In the combining layer 140, the first feature extracted in the flight stop control section 13 and the second feature extracted in the second extraction layer 132 are combined with each other. In the combining layer 140, the first and second features may be connected with each other by combining a plurality of values indicating the first and second features. That is, in the combining layer 140, a plurality of values indicating the first feature and a plurality of values indicating the second feature may be simply connected together. Alternatively, the first and second features may be connected with each other by performing linear connection on the plurality of values indicating the first and second features.

Alternatively, in the combining layer 140, the first and second features may be connected together by connecting the plurality of values indicating the first and second features together and performing linear connection on a plurality of values connected together.

In addition, in the combining layer 140, a probability of each of a plurality of labels may be calculated through a process including combining and weighted addition of the plurality of values indicating the first and second features. Here, the probability of each of the plurality of labels is a probability that the label represents the content of the text 121 in the first language or the content of the text 122 in the second language.

The identification model 107 may identify labels in accordance with the calculated probabilities. For example, the labels identified by the identification model 107 as labels representing the content of the text 121 in the first language and the content of the text 122 in the second language are labels with which the calculated probabilities are higher than a certain value.

The identification model 107 may include a first input layer to which information indicating the text 121 in the first language is input, a second input layer to which information indicating the text 122 in the second language is input, and an output layer that outputs information indicating labels identified by the identification model 107.

The identification model 107 may include the first input layer, the second input layer, and the output layer separately from the first extraction layer 131, the second extraction layer 132, and the combining layer 140. The identification model 107 may include the first input layer in the first extraction layer 131. The identification model 107 may include the second input layer in the second extraction layer 132. The identification model 107 may include the output layer in the combining layer 140. In particular, the combining layer 140 may double as the output layer. That is, the combining layer 140 may be the output layer.

The text 121 in the first language may be converted using the first conversion model and input to the identification model 107. Similarly, the text 122 in the second language may be converted using the second conversion model and input to the identification model 107.

Figure 10:
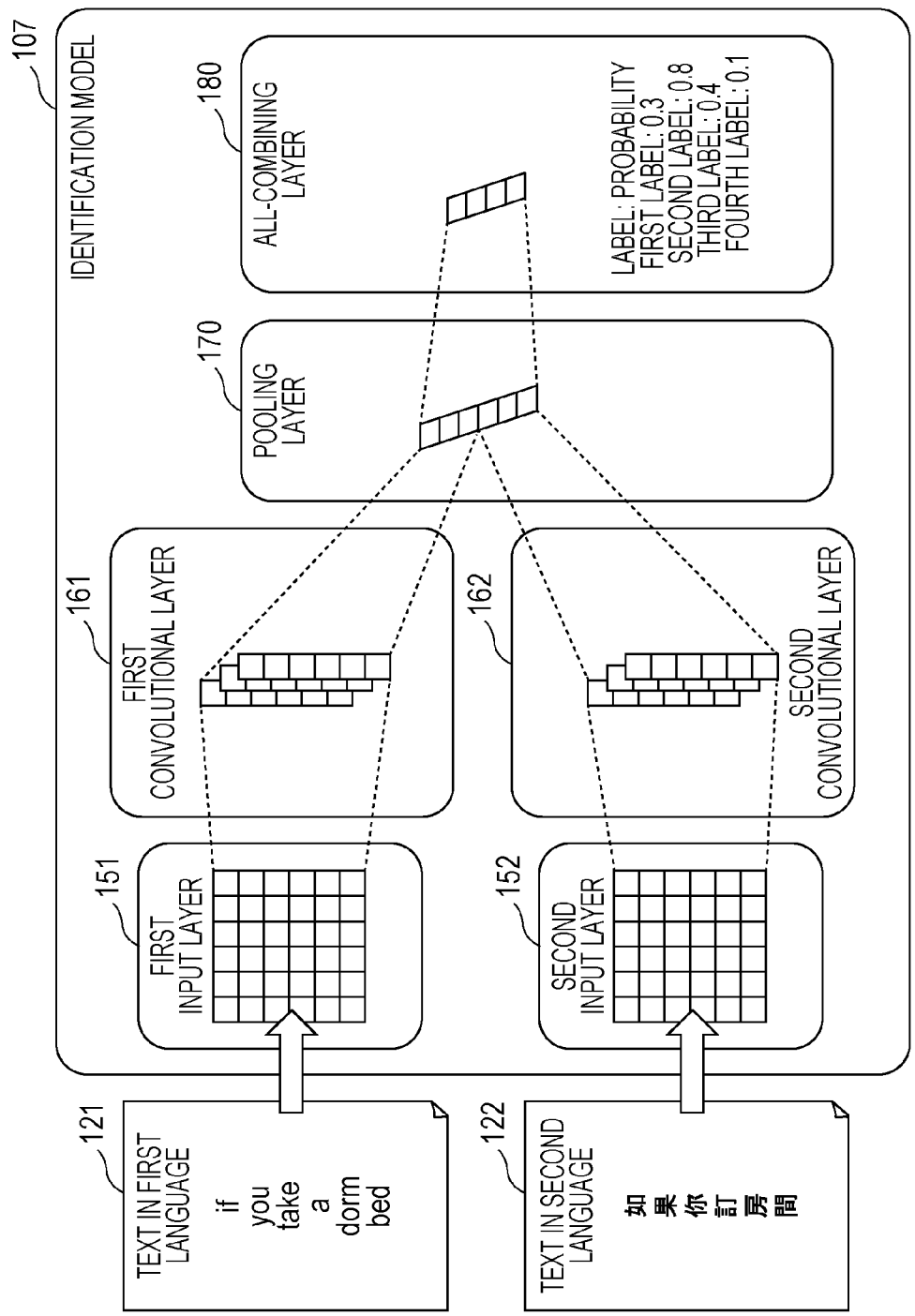
FIG. 10 is a schematic diagram illustrating a second example of the configuration of the identification model according to the embodiment.

FIG. 10 is a schematic diagram illustrating a second example of the configuration of the identification model 107 illustrated in FIG. 3. In the example illustrated in FIG. 10, the identification model 107 is a CNN model and includes a first input layer 151, a second input layer 152, a first convolutional layer 161, a second convolutional layer 162, a pooling layer 170, and an all-combining layer 180.

For example, the first convolutional layer 161 or a combination of the first input layer 151 and the first convolutional layer 161 illustrated in FIG. 10 corresponds to the first extraction layer 131 illustrated in FIG. 9. The second convolutional layer 162 or a combination of the second input layer 152 and the second convolutional layer 162 illustrated in FIG. 10 corresponds to the second extraction layer 132 illustrated in FIG. 9. At least either the pooling layer 170 or the all-combining layer 180 illustrated in FIG. 10 corresponds to the combining layer 140 illustrated in FIG. 9.

Information indicating the text 121 in the first language is input to the first input layer 151. In this example, in particular, the text 121 in the first language is converted into a vector string using the first conversion model, and a two-dimensional matrix indicating the vector string is input to the first input layer 151. In the first convolutional layer 161, the two-dimensional matrix input to the first input layer 151 is convoluted using a plurality of filters. As a result, the feature of the text 121 in the first language is extracted.

Information indicating the text 122 in the second language is input to the second input layer 152. In this example, in particular, the text 122 in the second language is converted into a vector string using the second conversion model, and a two-dimensional matrix indicating the vector string is input to the second input layer 152. In the second convolutional layer 162, the two-dimensional matrix input to the second input layer 152 is convoluted using a plurality of filters. As a result, the feature of the text 122 in the second language is extracted.

In the pooling layer 170, the feature of the text 121 in the first language and the feature of the text 122 in the second language are combined with each other by combining the plurality of values obtained by the first convolutional layer 161 as a matrix and the plurality of values obtained by the second convolutional layer 162 as a matrix with each other. At this time, in the pooling layer 170, an increase in dimensions is suppressed by subsampling the plurality of values obtained by the first convolutional layer 161 as a matrix and the plurality of values obtained by the second convolutional layer 162 as a matrix.

The all-combining layer 180 calculates a probability of each of a plurality of labels through a process including weighted addition of a plurality of values obtained as a result of the combining performed by the pooling layer 170. Label identified by the identification model 107 as labels representing the content of the text 121 in the first language and the content of the text 122 in the second language are labels with which the probabilities calculated by the all-combining layer 180 are higher than a certain value.

With the above-described configuration, the CNN model can be used as the identification model 107.

In the example illustrated in FIG. 10, the identification model 107 includes the first convolutional layer 161 corresponding to the first language, the second convolutional layer 162 corresponding to the second language, and the pooling layer 170 common to the first and second languages. That is, the identification model 107 separately includes at least one convolutional layer corresponding to the first language and at least one convolutional layer corresponding to the second language and also includes at least one pooling layer common to the first and second languages.

The identification model 107 is not limited to the example illustrated in FIG. 10. The identification model 107 may separately include at least one pooling layer corresponding to the first language and at least one pooling layer corresponding to the second language and also include at least one convolutional layer common to the first language and the second language, instead. Alternatively, the identification model 107 may include a plurality of convolutional layers and a plurality of pooling layers stacked alternately on one another.

The information corresponding to the first language and the information corresponding to the second language may be combined with each other not by the pooling layer 170 but by the all-combining layer 180. That is, the identification model 107 need not include the pooling layer 170 common to the first and second language.

Figure 11:
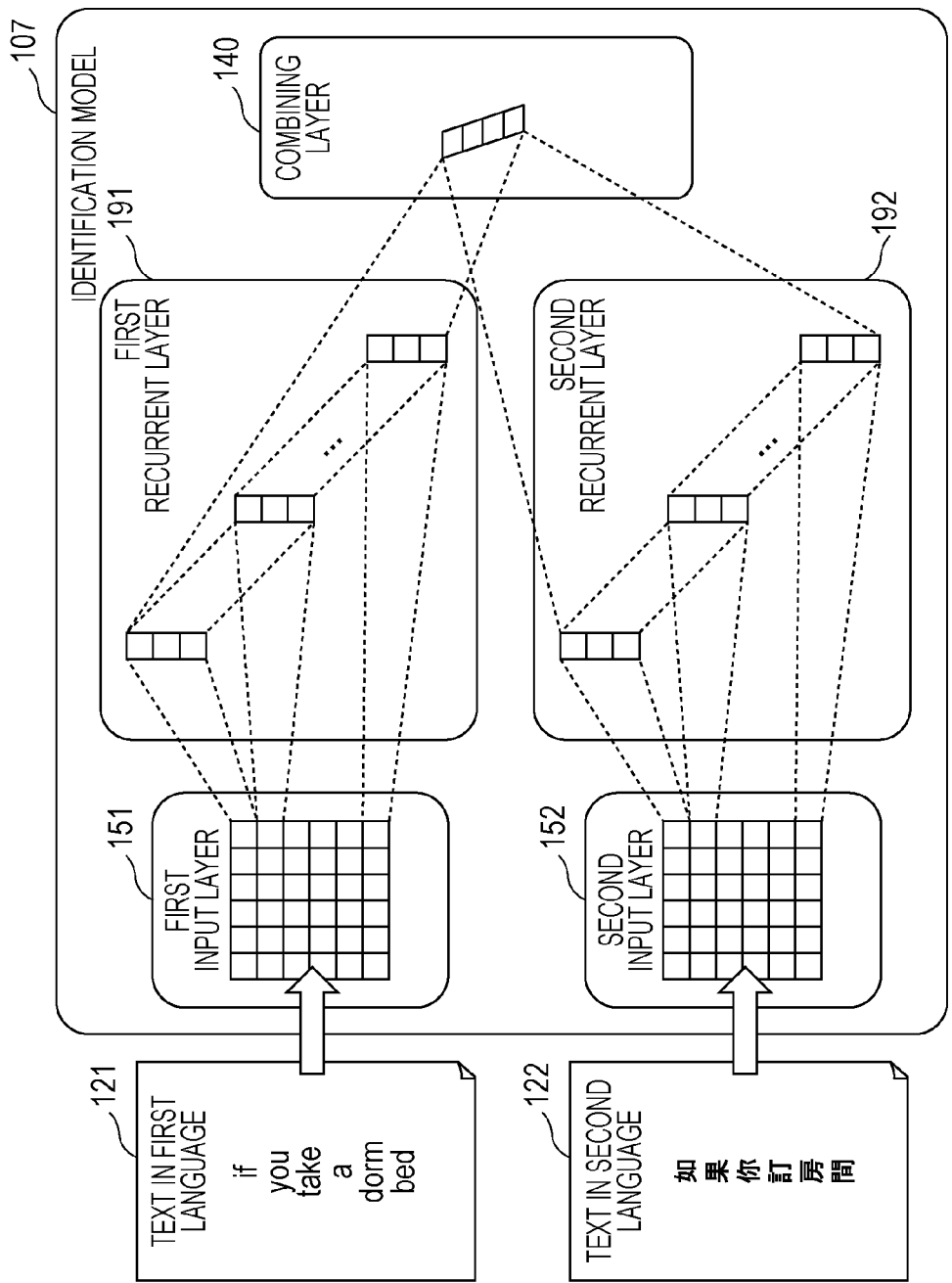
FIG. 11 is a schematic diagram illustrating a third example of the configuration of the identification model according to the embodiment.

FIG. 11 is a schematic diagram illustrating a third example of the configuration of the identification model 107 illustrated in FIG. 3. In the example illustrated in FIG. 11, the identification model 107 is an RNN model and includes the first input layer 151, the second input layer 152, a first recurrent layer 191, a second recurrent layer 192, and the combining layer 140.

For example, the first recurrent layer 191 or a combination of the first input layer 151 and the first recurrent layer 191 illustrated in FIG. 11 corresponds to the first extraction layer 131 illustrated in FIG. 9. The second recurrent layer 192 or a combination of the second input layer 152 and the second recurrent layer 192 illustrated in FIG. 11 corresponds to the second extraction layer 132 illustrated in FIG. 9. The combining layer 140 illustrated in FIG. 11 corresponds to the combining layer 140 illustrated in FIG. 9.

As in the example illustrated in FIG. 10, the information indicating the text 121 in the first language is input to the first input layer 151. For example, the text 121 in the first language is converted into a vector string using the first conversion model, and the vector string is input to the first input layer 151. A plurality of vectors included in the vector string may be sequentially input to the first input layer 151 and processed. In the first recurrent layer 191, the feature of the text 121 in the first language is extracted by extracting a feature of the vector string input to the first input layer 151.

For example, in the first recurrent layer 191, a process for extracting a feature is sequentially performed on the plurality of vectors included in the vector string input to the first input layer 151. At this time, the process for extracting a feature is performed on a current vector using the current vector and results of the process for extracting a feature performed on previous vectors. That is, the results of the process for extracting a feature performed on the previous vectors are reflected by the process for extracting a feature performed on the current vector, and, as a result, a relationship between elements is reflected by the process for extracting a feature.

As in the example illustrated in FIG. 10, in the second input layer 152, the information indicating the text 122 in the second language is input. For example, the text 122 in the second language is converted into a vector string using the second conversion model, and the vector string is input to the second input layer 152. A plurality of vectors included in the vector string may be sequentially input to the second input layer 152 and processed. In the second recurrent layer 192, the feature of the text 122 in the second language is extracted by extracting a feature of the vector string input to the second input layer 152.

For example, in the second recurrent layer 192, a process for extracting a feature is sequentially performed on the plurality of vectors included in the vector string input to the second input layer 152. At this time, the process for extracting a feature is performed on a current vector using the current vector and results of the process for extracting a feature performed on previous vectors. That is, the results of the process for extracting a feature performed on the previous vectors are reflected by the process for extracting a feature performed on the current vector, and, as a result, a relationship between elements is reflected by the process for extracting a feature.

In the combining layer 140, the feature of the text 121 in the first language and the feature of the text 122 in the second language are combined with each other by combining the plurality of values obtained by the first recurrent layer 191 and the plurality of values obtained by the second recurrent layer 192 with each other. In the combining layer 140, a probability of each of a plurality of labels is calculated through a process including combining and weighted addition of the plurality of values.

Labels identified by the identification model 107 as labels representing the content of the text 121 in the first language and the content of the text 122 in the second language are labels with which the probabilities calculated by the combining layer 140 are higher than a certain value.

With the above-described configuration, the RNN model can be used as the identification model 107.

In the example illustrated in FIG. 11, as in FIG. 10, a vector string that is a matrix is input to the identification model 107. The information input to the identification model 107, however, need not be a vector string that is a matrix.

The examples of the configuration illustrated in FIGS. 9, 10, and 11 are examples of the configuration of the identification model 107. The configuration of the identification model 107 is not limited to the examples of the configuration illustrated in FIGS. 9, 10, and 11.

The method for controlling identification and the identification control apparatus 100 according to the present embodiment are effective especially when a language corresponding to training data is different from a language corresponding to identification target data.

An example in which the number of languages is two has been described above. The method for controlling identification and the identification control apparatus 100 according to the present embodiment, however, can be applied to three or more languages. For example, when a language is added, a component corresponding to the added language may also be added. In addition, additional machine translation may be performed for the added language. Text in three or more languages may then be input to the identification model 107, and labels representing the text may be identified.

In addition, the identification control apparatus 100 may perform machine translation. For example, the identification control apparatus 100 may translate text in the first language into the second language or translate text in the second language into the first language. That is, the identification control apparatus 100 may obtain text in the second language by translating text in the first language into the second language or obtain text in the first language by translating text in the second language into the first language.

The identification control apparatus 100 can thus obtain only text in the first language or text in the second language and perform learning or identification.

Evaluation Example

Next, evaluation according to a fifth dialog state tracking challenge (DSTC5) will be introduced as an example of evaluation of the identification model 107 according to the present embodiment.

The DSTC5 was a fifth content over the accuracy of identifying intentions of dialogs. A multichannel CNN model used in the following description corresponds to the identification model 107 described in the present embodiment. Dialog segments correspond to text. Dialog states correspond to labels representing the content of text.

Although written dialogs will be basically used in the following description, spoken dialogs may be converted into written dialogs through speech recognition, for example, and used, instead. Strictly speaking, the DSTC5 related to tracking of dialog states. Although the term "identification" will be used in the following description instead of "tracking" to facilitate understanding, "identification" may be replaced with "tracking".

Although a CNN model will be used in the following description, the same holds for another model such as RNN model.

1. Overview

A scenario provided in the DSTC5 related to cross-language identification of dialog states. In this scenario, participants were expected to construct identification devices on the basis of English data with labels and examine the identification devices on the basis of Chinese data without labels. In addition, translations created by a computer were given to both the English data and the Chinese data. These translations, however, included errors. If the translations were thoughtlessly used, therefore, the performance of the identification devices might decrease.

The present inventors proposed an architecture of a multichannel CNN model. In this architecture, the English data and the Chinese data were input to a common multichannel CNN model. The architecture effectively improved robustness against mistranslations.

Furthermore, the architecture was purely based on machine learning. A large amount of preliminary knowledge about both languages, therefore, was not needed. Because developers of the identification devices might not be conversant with the two languages, this characteristic was effective in constructing the identification devices.

In the following description, a multichannel CNN model will be referred to simply as a "multichannel model".

2. Introduction

Identification of dialog states is one of primary tasks in dialog processing. More specifically, dialog states, which represent the content of dialog segments as values, are identified from the dialog segments in order for a computer to process dialogs easily. A series of dialog state tracking challenges (DSTCs) have been conducted in order to provide a general platform for this task.

Four DSTCs that had been conducted had provided precious support for studies in this field and helped researchers to improve latest techniques. Since the fourth DSTC, dialogs whose dialog states are to be identified have changed from dialogs between a human and a machine to dialogs between humans. Difficulty in identifying dialog states has accordingly increased because of the flexibility and ambiguity of dialogs between humans.

In machine learning, it is difficult to construct, with a limited amount of training data, an identification device effective in dialogs between humans. This situation is not preferable because preparation of training data with labels basically takes great cost, long time, and specialists. In addition, the construction of an identification device for a new language requires new training data for the new language.

In the DSTC5, it was proposed that rapidly evolved machine translation technologies be used. In doing so, an identification device constructed with a certain language could be adapted to a new language without taking time to prepare training data for the new language. Use of the machine translation technologies was extremely attractive. For example, not only would it be possible to reduce the cost of adapting the identification device to a new language, but the identification device could be constructed with training data in another language.

More specifically, use of the machine translation technologies was effective in travel information systems. Even if data was collected from speakers of different languages, that is, travelers from different countries, for example, the amount of data in each language might be limited. If data in different languages was combined together, however, a sufficient amount of data for training was obtained.

Although the machine translation technologies had recently made a great step forward, translation quality was not yet high enough. A single-language identification model trained by translations created by a computer might be imperfect. In addition, identification performance in translations created from another language might be lower.

In view of this, the present inventors proposed a multichannel model that was simultaneously trained by a plurality of languages and that used original dialog segments and their translations as inputs for identifying dialog states. In doing so, construction of an identification device based only on translations created by a computer would be avoided. In addition, the multichannel model would make the most of a plurality of pieces of information regarding the plurality of languages and improve robustness against mistranslations.

3. Data Set

All data of the DSTC4, including training data, development data, and test data, was used as training data of the DSTC5. The training data included 35 dialog sessions relating to Singapore travel information collected from English speakers.

In addition to the training data, development data including two dialog sessions collected from Chinese speakers was provided before final evaluation in order to check the performance of the identification device. Dialog states were added to the training data and the development data as labels, and the training data and the development data each included top five English or Chinese translations created by a machine translation system.

In an evaluation stage of the DSTC5, test data including eight Chinese dialogs without labels were distributed to the participants. Results of identification submitted by the participants were then evaluated through comparison between labels obtained by the participants and true labels. As with the training data and the development data, the test data included top five English translations created by the machine translation system.

Dialog states in the DSTC5 were defined by the same ontology as in the DSTC4. As illustrated in FIG. 12, the ontology included five topics with different slot sets.

Each dialog state represented a most characteristic piece of information referred to in a dialog segment in relation to a combination of a topic and a slot. In the case of a combination of a topic "food" and a slot "cuisine", for example, the dialog state indicated a type of food. In the case of a combination of a topic "transportation" and a slot "station", the dialog state indicated a train station.

A total number of combinations of a topic and a slot was 30. For each combination of a topic and a slot, all possible dialog states were given as a list in the ontology. A primary task in the DSTC5 was to identify appropriate dialog states for the slots from the dialog segments, topics of the dialog segments, and dialog histories before the dialog segments. FIG. 13 illustrates a dialog segment and a dialog state.

4. Method 4.1 Framework

In the DSTC 4, the present inventors proposed a method based on a CNN model. With this method, a highest level of performance was achieved in identification with respect to a slot "info". The CNN model used in this method was common to all the topics and included an additional multitopic convolutional layer so that information provided in a plurality of topics was handled more appropriately.

The model was trained through various topics. Even if the amount of training data was limited, a high level of performance was achieved. The training data in the DSTC5 was larger than the training data in the DSTC4 by 75%. The amount of training data was no longer significantly limited.

In order to put more weight on overcoming barriers between languages in the DSTC5, the present inventors adopted, instead of the method in the DSTC4, a method in which an individual CNN model was trained for each topic. That is, in the method in the DSTC5, for example, the combination of the topic "food" and the slot "info" and the combination of a topic "shopping" and the slot "info" were trained by two independent models.

Furthermore, in order to provide a method that was generally applicable and easily adjustable, the same hyperparameters were set for the individual CNN models for the combinations of a slot and a topic.

Figure 14:
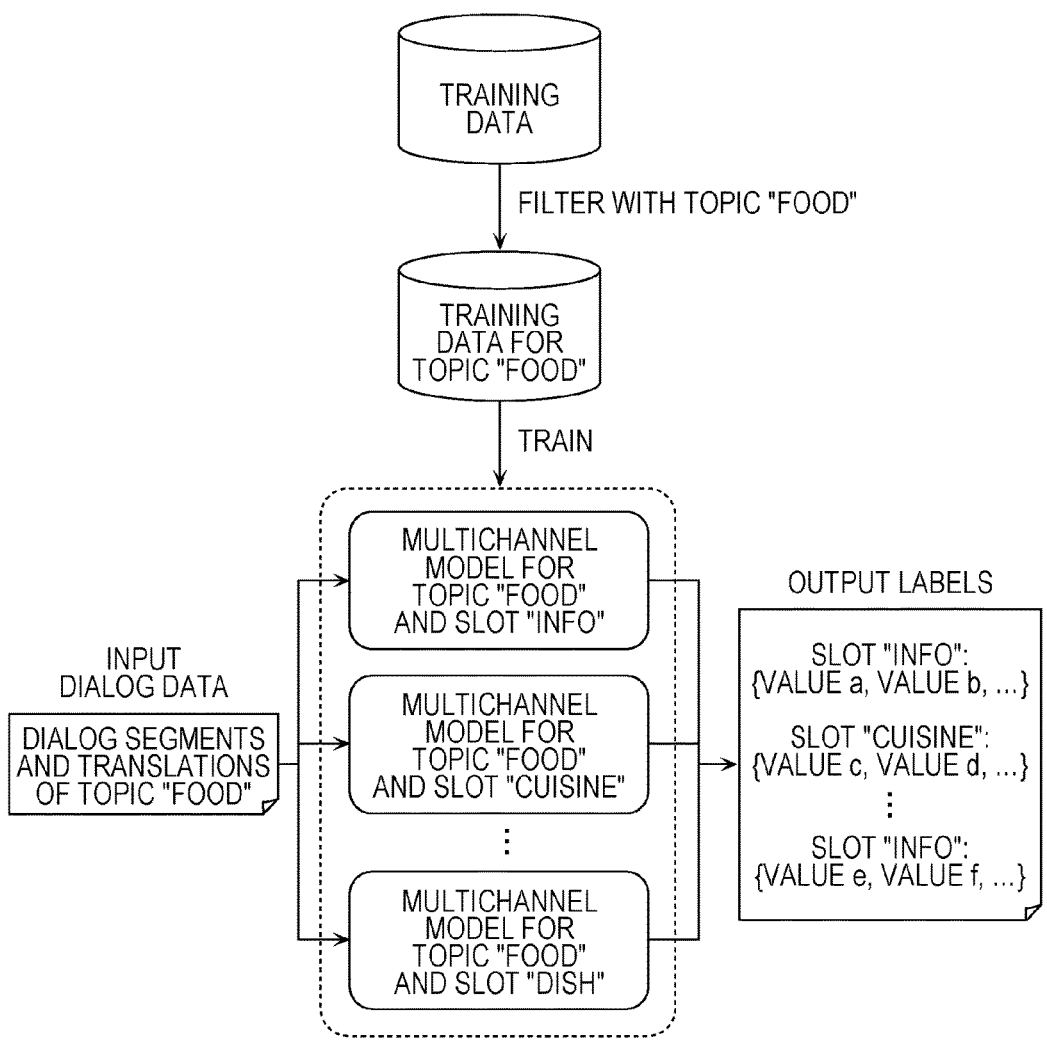
FIG. 14 is a schematic diagram illustrating a multichannel model and input/output data in the evaluation example.

FIG. 14 is a schematic diagram illustrating a method adopted by the present inventors in the DSTC 5. A multichannel model, which was a CNN model, was constructed for each combination of a topic and a slot. For example, training data for the topic "food" was obtained by filtering the training data with the topic "food". The multichannel model for each slot of the topic "food" was trained by this training data for the topic "food".

Dialog segments relating to the topic "food" and translations of the dialog segments were then input to the multichannel model for each slot of the topic "food". Information indicating a dialog state of each slot of the topic "food" as a label was then output.

4.2 Motive

In the DSTC5, the training data and the test data were given in different languages. In addition, Chinese and English translations created by the computer were provided for the training data and the test data. One of direct methods was a method in which the English translations of the test data were used for a model trained by the English training data. Another direct method was a method in which the Chinese test data was used for a model trained by the Chinese translations of the training data.

In these methods, however, either the training data or the test data was not directly used but the translations thereof were used. In order to make the most of both the English data and the Chinese data, the present inventors proposed a multichannel mode, which was a model to which both the English data and the Chinese data were input.

4.3 Model Architecture

Figure 15:
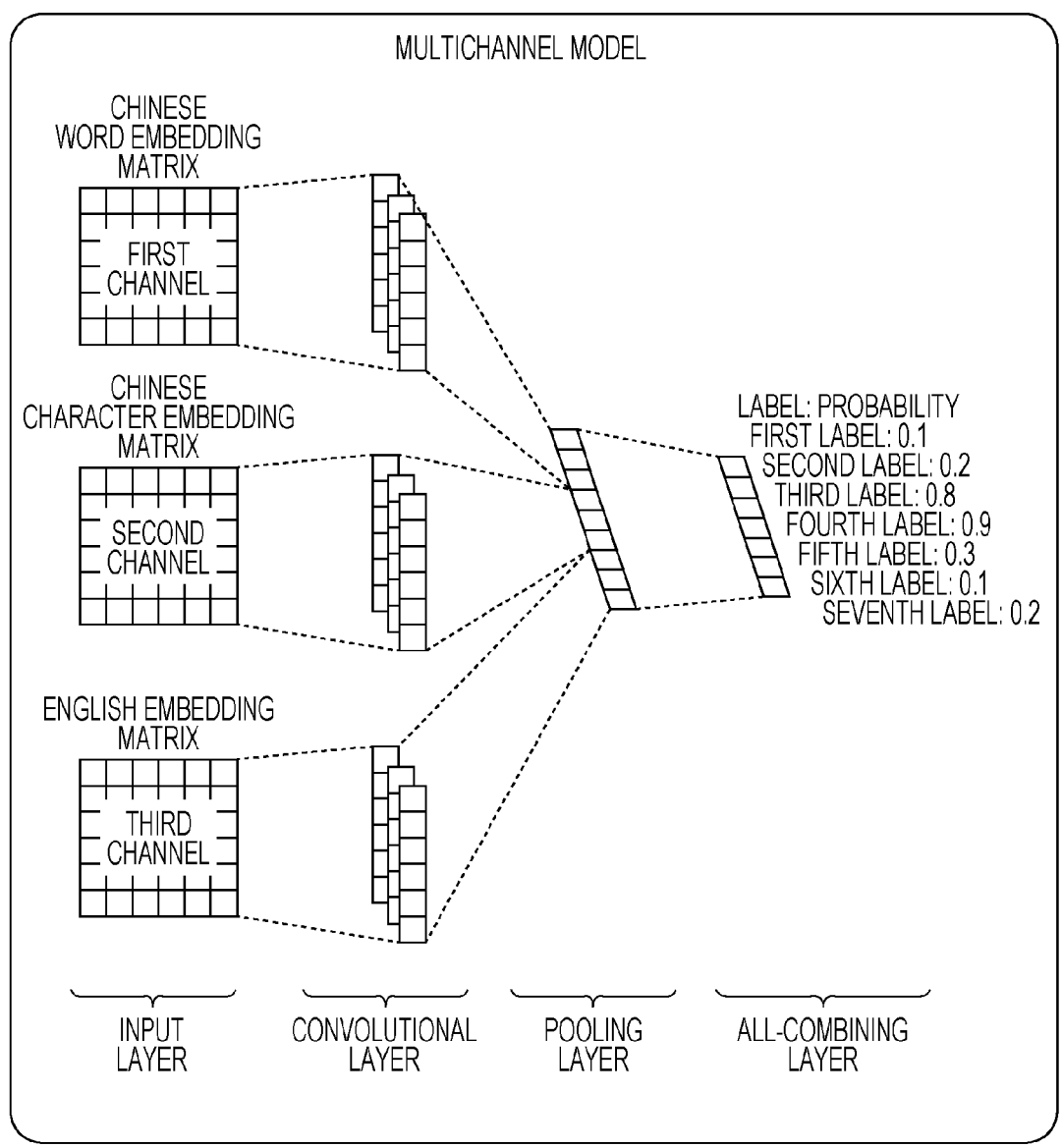
FIG. 15 is a schematic diagram illustrating the configuration of the multichannel model in the evaluation example.

FIG. 15 is a schematic diagram illustrating the configuration of a multichannel model proposed by the present inventors in the DSTC5.

According to the present inventors' proposal, a multichannel model that was often used in image processing was applied to processing of a plurality of languages. In processing of a color image, a plurality of input channels of the multichannel model were used as a plurality of input channels corresponding to red (R), green (G), and blue (B). In processing of a plurality of languages, the plurality of input channels of the multichannel model were used as a plurality of input channels corresponding to the plurality of languages.

In the multichannel model, input data corresponding to each input channel was a two-dimensional matrix expressed by the following expression, and each row of the two-dimensional matrix was a vector representation of a corresponding word and also called an "embedded vector".

$$s = \begin{bmatrix} -w_1- \\ -w_2- \\ \vdots \\ -w_n- \end{bmatrix} (w_i \in \mathbb{R}^k, s \in \mathbb{R}^{n \times k}) \quad (1)$$

Here, $w_i$ denotes an embedded vector of an i-th word in input text. s denotes a two-dimensional array and a matrix representation of the input text. s is also called an "embedded matrix". Three embedded models were used to convert the input text into a matrix using three formats, namely two Chinese formats and one English format. Details of these embedded models will be described later.

A feature map h was obtained by convoluting a filter m in an embedded matrix s for each channel using the following expression.

$$h=f(m*s+b)(m \in \mathbb{R}^{d \times k}, b \in \mathbb{R}^n, h \in \mathbb{R}^{h-d+1}) \quad (2)$$

Here, f denotes a nonlinear activation unit. As a nonlinear activation unit, a rectified linear unit (ReLU) may be used. * denotes a convolution operator. b denotes a bias term. A maximum value of the feature map h was then selected by the pooling layer. This selection process is represented by the following expression.

$$\hat{h}=\max\{h\} \quad (3)$$

In the selection process, a most distinct feature was extracted from an input matrix for each filter. Although information regarding a plurality of channels is connected together in the pooling layer in FIG. 15, the information need not necessarily be connected in the pooling layer. In the multichannel model, a plurality of features were extracted using a plurality of filters for each channel. These features were transmitted to the all-combining layer. The all-combining layer performed a calculation represented by the following expression.

$$y=S(w \cdot (\hat{h}_{ch1} \oplus \hat{h}_{ch2} \oplus \hat{h}_{ch3})+b \quad (4)$$

($\oplus$: connection operator, $\hat{h}_{chn}$: maximum value of feature map of n-th channel)

S is a sigmoid function. w denotes a weight, and y denotes a probability. A probability of each of a plurality of labels was calculated. That is, a probability of each of a plurality of dialog states was calculated.

In the multichannel model, features extracted from a plurality of channels were connected to one another before a final output. As result, a large amount of information obtained from the plurality of channels was used.

Embedded matrices in a plurality of languages might be significantly different from one another. In the multichannel model, therefore, different filter sets were used between the channels. For example, the same or substantially the same embedded vector might be associated with words in a plurality of languages whose meanings are significantly different from or unrelated to one another. In the multichannel model, a filter set corresponding to each of the plurality of languages was used to extract an appropriate feature from a matrix corresponding to the language.

4.4 Embedding Model

A Word2vec model is one of most common models for embedding words. More specifically, the Word2vec model is used to convert linguistic elements into vectors and is a two-layer neural network model. The Word2vec model was trained by a corpus of text such that a plurality of semantically close elements were converted into a plurality of close vectors.

In order to generate matrices to be input to the multichannel model, three different Word2vec models, namely an English embedding model, a Chinese word embedding model, and a Chinese character embedding model, which had been trained by three different training corpuses were used. The English embedding model, the Chinese word embedding model, and the Chinese character embedding model were specifically as follows.

The English embedding model was a Word2vec model for converting English words into 200-dimension vectors and trained by the content of all text included in English Wikipedia (registered trademark) that had been divided at spaces and decapitalized. The English embedding model had learned 253,854 English words.

The Chinese word embedding model was a Word2vec model for converting Chinese words into 200-dimension vectors and trained by the content of all text included in Chinese Wikipedia (registered trademark) that had been divided at word boundaries using a "jieba" module. The "jieba" module was a program for dividing the content of Chinese text by words. The Chinese word embedding model had learned 444,184 Chinese words and 53,743 English words included in Chinese Wikipedia (registered trademark).

The Chinese character embedding model was a Word2vec model for converting Chinese characters into 200-dimension vectors and trained by the content of all the text included in Chinese Wikipedia (registered trademark) that had been divided into Chinese characters. The Chinese character embedding model had learned 12,145 Chinese characters and the 53,743 English words included in Chinese Wikipedia (registered trademark).

It is not easy to identify word boundaries in Chinese text. For this reason, the Chinese word embedding model and the Chinese character embedding model were trained for Chinese.

In Chinese, a minimum unit of meaning might be a single character or might be a series of characters. In order to divide Chinese text, sentences need to be analyzed. For this reason, sufficient accuracy had not yet been achieved even with latest techniques. The Chinese word embedding model, therefore, might learn inaccurate words, and it was difficult to handle combinations of words appropriately.

Since the Chinese character embedding model did not rely on division of words, on the other hand, the Chinese character embedding model did not include errors and was capable of easily handling each character as a word. The Chinese character embedding model, however, ignored word boundaries. Embedding results, therefore, might not reflect accurate meanings.

Figure 16:
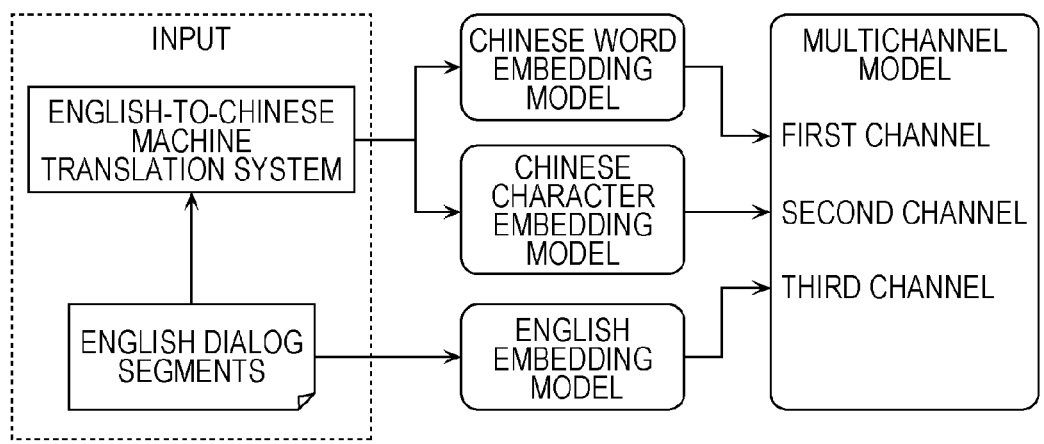
FIG. 16 is a schematic diagram illustrating preprocessing performed on training data in the evaluation example.

FIG. 16 is a schematic diagram illustrating preprocessing performed on the training data. English dialog segments included in the training data were converted by the English embedding model into an English embedding matrix including English word vectors and input to a third channel of the multichannel model. The English dialog segments are also converted by an English-to-Chinese machine translation system into Chinese translation dialog segments.

The Chinese translation dialog segments were then converted by the Chinese word embedding model into a Chinese word embedding matrix including Chinese word vectors and input to a first channel of the multichannel model. The Chinese translation dialog segments were also converted by the Chinese character embedding model into a Chinese character embedding matrix including Chinese character vectors and input to a second channel of the multichannel model.

Figure 17:
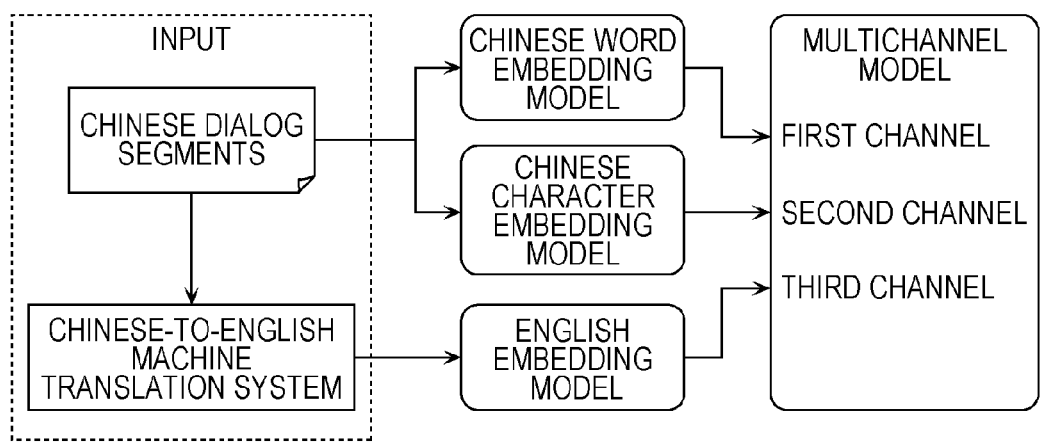
FIG. 17 is a schematic diagram illustrating preprocessing performed on development data and test data in the evaluation example.

FIG. 17 is a schematic diagram illustrating preprocessing performed on the development data and the test data. Chinese dialog segments included in the development data and the test data were converted by the Chinese word embedding model into a Chinese word embedding matrix including Chinese word vectors and input to the first channel of the multichannel model. The Chinese dialog segments were also converted by the Chinese character embedding model into a Chinese character embedding matrix including Chinese character vectors and input to the second channel of the multichannel model.

The Chinese dialog segments were converted by a Chinese-to-English machine translation system into English translation dialog segments. The English translation dialog segments were then converted by the English embedding model into an English embedding matrix including English word vectors and input to the third channel of the multichannel model.

5. Results 5.1 Results of Evaluation in DSTC5

FIG. 18 illustrates scores earned by the method proposed by a team of the present inventors as well as scores of other teams. A team number of the present inventors was "2".

The multichannel model proposed by the present inventors earned a highest score among nine teams. A correct answer rate in an entry "3" was 0.0956, and a second highest correct answer rate earned by another team in that entry was 0.0635. An F-measure in the entry "3" was 0.4519, and a second highest F-measure earned by another team was 0.3945. That is, in the entry "3", the team of the present inventors exceeded the second best team by about 50% in terms of the correct answer rate and about 15% in terms of the F-measure.

In five entries "0" to "4" of the team of the present inventors, hyperparameters were different from one another. FIG. 19 illustrates the hyperparameters. Among the hyperparameters, a dropout rate significantly affects results. Dropout is known as a technique for suppressing overlearning, which deteriorates generalization performance due to learning of peculiar data, in neural network models.

With respect to the five entries "0" to "4", a reproduction rate decreased and a matching rate increased as the dropout rate decreased. A further decrease in the dropout rate, however, did not improve overall performance. In FIGS. 18 and 19, two entries "5" and "6" correspond to setting of hyperparameters in which the dropout rate was lower and results of the setting, respectively.

5.2 Multichannel Model, Single-Channel Model, and Combination Model

Figure 20:
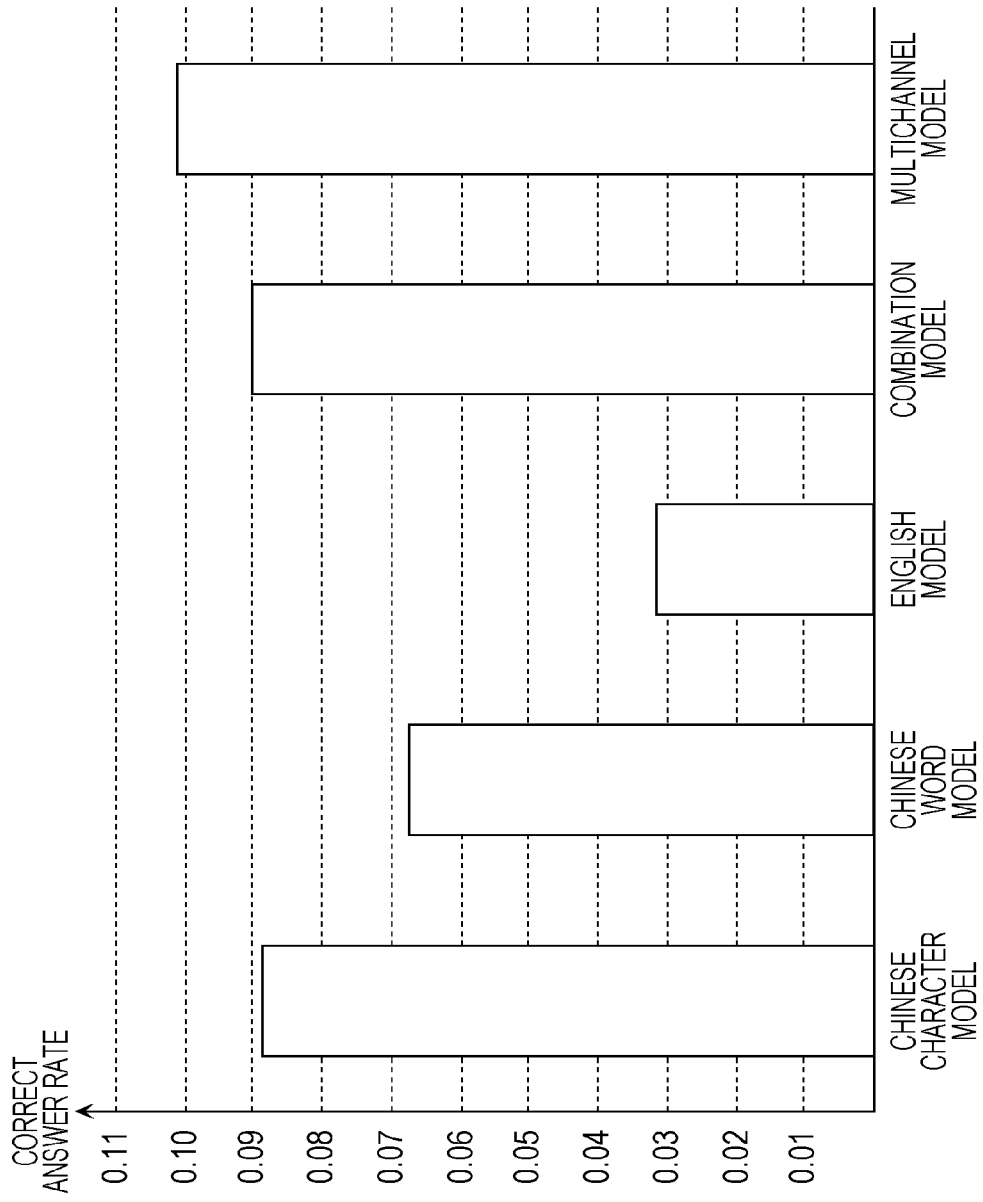
FIG. 20 is a graph indicating correct answer rates of models in terms of labels estimated in the evaluation example.

The present inventors compared the multichannel model and a common single-channel model for performance in order to examine the contribution of the multichannel model. For the comparison, three single-channel models were trained using the above-described three embedding models. Top translations were used for the training. FIG. 20 illustrates results of the evaluation. The performance of the multichannel model exceeded that of the three single-channel models. The Chinese character model exhibited the highest performance among the three single-channel models.

In the past DSTCs, a technique for combining a plurality of models was used to improve identification performance. A final output of such a combination corresponded to an average of outputs of a plurality of single-channel models. In FIG. 20, a result obtained by a combination of the three single-channel models is illustrated as a combination model. The performance of the combination model is close to that of the multichannel model. Because the combination model can be relatively easily constructed, the combination model may be used instead of the multichannel model.

5.3 Examination

The above results can be partly explained from the perspective of ensemble learning. In the multichannel model, the plurality of channels provided more features regarding data. Such features appropriately complemented information. In addition, the all-combining layer in the multichannel model was optimized. The multichannel model, therefore, improved robustness against mistranslations.

FIG. 21 illustrates a case in which the multichannel model was actually used and labels identified by each model. In this example, the three single-channel models did not output correct labels. The multichannel model, on the other hand, output the correct labels.

The combination model performs an operation like simple voting. That is, labels identified by more single-channel models are selected. The multichannel model, on the other hand, selects labels whose degrees of reliability are high on the basis of a plurality of features. As a result, the multichannel model appropriately identified a label "walking", which was identified by one of the three single-channel models, and appropriately rejected a label "exhibit", which was selected by two of the three single-channel models.

Figure 22:
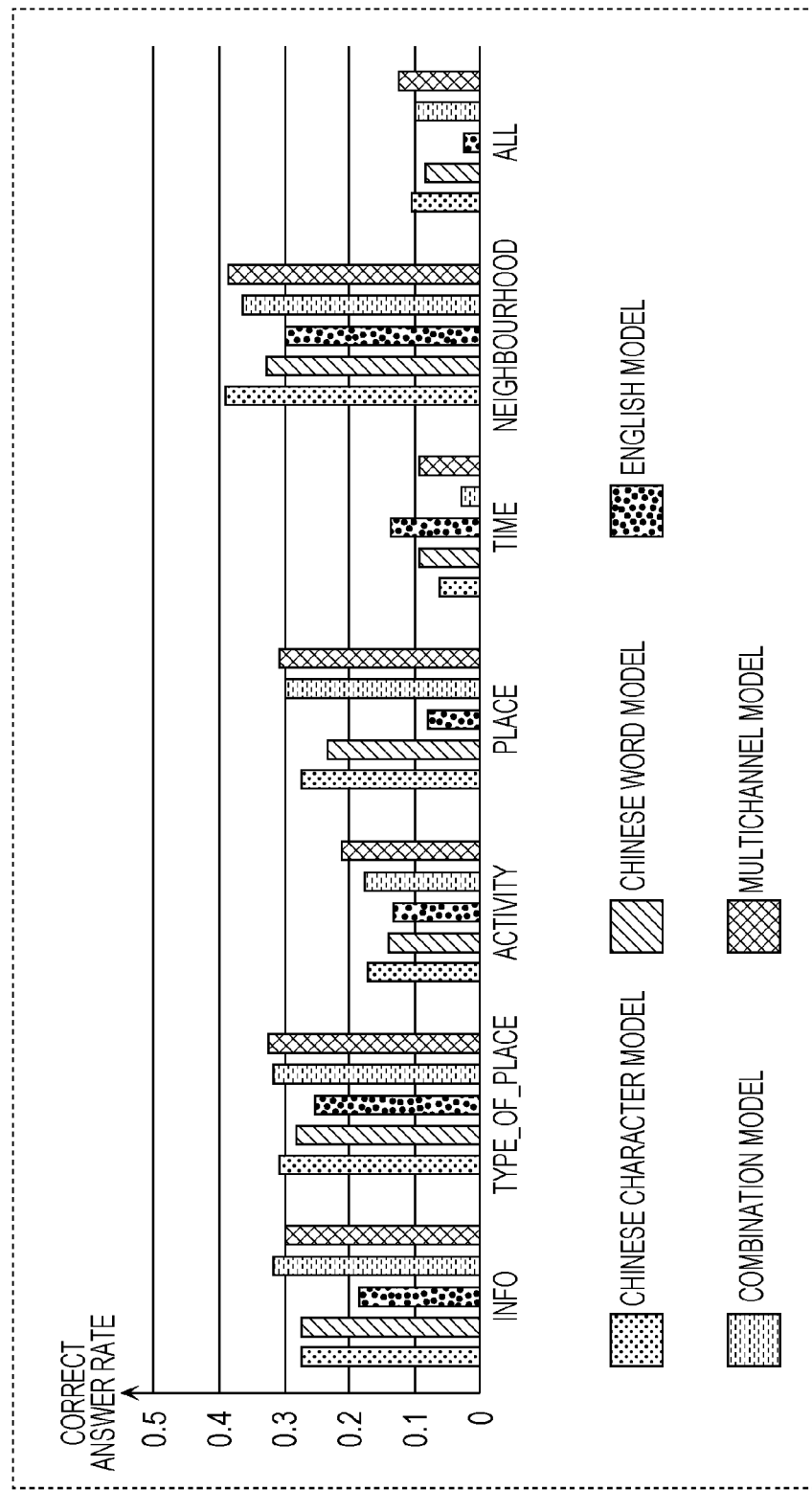
FIG. 22 is a graph indicating correct answer rates of the models in terms of labels estimated for slots in the evaluation example.

An actual situation, however, was more complex. As illustrated in FIG. 22, the correct answer rate differed between slots, and the ranking of the performance of the plurality of models partly differed between the slots. Such differences probably occurred due to different levels of ambiguity caused by machine translation in different themes.

For example, English words "evening" and "night" are translated as the same Chinese word "wan shang" with probabilities of 96% and 43%, respectively. This Chinese word has meanings of both "evening" and "night", but there are more accurate Chinese words corresponding to "evening" and "night".

Such inaccuracy of translation makes it difficult to identify labels "evening" and "night" in Chinese and results in a decrease in the performance of the Chinese single-channel models in a slot "time".

In addition, when a translation direction is reversed, translation quality might change due to differences in word forms, word order, and grammar between two languages. Since the training data included only one translation direction in the DSTC5, namely from English to Chinese, the multichannel model was not optimized in an opposite translation direction. The multichannel model, therefore, may include a bias in a plurality of features corresponding to the plurality of channels on the basis of translation quality or the like. The combination model, too, may include a bias between the models used therein.

In addition, the multichannel model may be trained in two translation directions in order to improve performance.

6. Conclusion on Evaluation

The present inventors propose a multichannel model that receives a plurality of languages through a plurality of different channels. The multichannel model has robustness against mistranslations and higher performance than any kind of single-channel model. Furthermore, preliminary knowledge about a new language is not needed. Data in different languages, therefore, can be easily applied to the multichannel model.

As a result, the multichannel model is capable of reducing cost of application of a new language and identifying dialog states in a plurality of languages.

SUMMARY

As described above, in the method for controlling identification according to an aspect of the present disclosure, first text, second text, and correct labels are obtained. The first text is text in the first language. The second text is text in the second language and obtained by translating the first text into the second language. The correct labels indicate the content of the first text.

The first text and the second text are then input to the identification model 107 common to the first and second languages, respectively. The common identification model 107 is updated such that labels identified by the common identification model 107 from the first text and the second text match the correct labels.

The first text in the first language and the second text in the second language are thus both input to the common identification model 107. The common identification model 107 is then updated such that the common identification model 107 identifies appropriate labels. That is, the identification model 107 based on a plurality of languages capable of identifying appropriate labels from a plurality of sets of text in the plurality of languages is constructed.

The identification model 107 based on the plurality of languages is appropriately trained in a cross-language manner. The identification model 107 based on the plurality of languages, therefore, can identify labels more appropriately than an identification model based on a single language or a combination of identification models based on a single language. The identification model 107, therefore, can appropriately identify labels representing the content of text in an environment in which the plurality of languages are used. That is, label identification quality improves in an environment in which the plurality of languages are used.

For example, a first conversion model may convert first text into a first value string, and a second conversion model may convert second text into a second value string. The first conversion model converts a plurality of elements expressed in the first language into a plurality of close values when the plurality of elements are semantically close to one another. The second conversion model converts a plurality of elements expressed in the second language into a plurality of close values when the plurality of elements are semantically close to one another. The first text converted into the first value string and the second text converted into the second value string may be input to the common identification model 107.

As a result, the conversion model based on the meanings of the elements expressed in each language can convert the corresponding text into a value string and input the text converted into the value string to the common identification model 107.

In addition, for example, the first conversion model may convert the plurality of elements expressed in the first language into a plurality of close vectors when the plurality of elements are semantically close to one another. The second conversion model may convert the plurality of elements expressed in the second language into a plurality of close vectors when the plurality of elements are semantically close to one another. The first value string may be a first vector string. The second value string may be a second vector string.

As a result, the conversion model based on the meanings of the elements expressed in each language can convert the corresponding text into a vector string and input the text converted into the vector string to the common identification model 107.

In addition, for example, the common identification model 107 may be a convolutional neural network model. As a result, a convolutional neural network model is used as the identification model 107 for identifying labels. The convolutional neural network model appropriately extracts features and identifies appropriate labels based on the extracted features. Appropriate labels can thus be identified.

In addition, for example, the convolutional neural network model may include a plurality of convolutional layers and a plurality of pooling layers alternately stacked on one another.

As a result, a convolutional neural network model in which a plurality of convolutional layers and a plurality of pooling layers are alternately stacked on one another is used as the identification model 107 for identifying labels. The convolution neural network model in which the plurality of convolutional layers and the plurality of pooling layers are alternately stacked on one another extracts features more appropriately through a plurality of feature extraction operations performed on input information. More appropriate labels can therefore be identified.

In addition, for example, the convolutional neural network model may separately include at least one convolutional layer corresponding to the first language and at least one convolutional layer corresponding to the second language. As a result, the convolutional layer corresponding to each language can appropriately extract features. That is, the feature of each language can be appropriately extracted.

In addition, for example, the convolutional neural network model may separately include at least one pooling layer corresponding to the first language and at least one pooling layer corresponding to the second language. As a result, the pooling layer corresponding to each language can reduce dimensions of information indicating features. That is, the dimensions can be reduced before the plurality of features corresponding to the plurality of languages are combined with each other. An increase in the amount of calculation can therefore be suppressed.

In addition, for example, the convolutional neural network model may include at least one pooling layer common to the first and second languages. As a result, the plurality of features corresponding to the plurality of languages can be combined with each other. The plurality of features combined with each other can be used to identify labels.

In addition, for example, the convolutional neural network model may include at least one convolutional layer common to the first and second languages. As a result, the at least one convolution layer common to the plurality of languages can extract the features. That is, the features can be extracted as a process common to the plurality of languages. An increase in the amount of calculation can therefore be suppressed.

In addition, for example, the common identification model 107 may be a recurrent neural network model. As a result, the recurrent neural network model, which is suitable for natural language processing, is used as the identification model 107 for identifying labels. Labels representing the content of text can be appropriately identified.

In addition, for example, the common identification model 107 may include a first extraction layer in which a first feature, which is a feature of text in the first language, is extracted, a second extraction layer in which a second feature, which is a feature of text in the second language, is extracted, and a combining layer in which the first feature and the second feature are combined with each other.

As a result, the identification model including the plurality of extraction layers and the combining layer is used as the identification model 107 for identifying labels. The identification model 107 including these layers is trained as a whole. Labels can therefore be appropriately identified.

In addition, for example, in the combining layer, a plurality of values indicating the first and second features may be connected with each other. As a result, the plurality of values indicating the plurality of features corresponding to the plurality of languages can be simply combined with each other. A result of the combining can be used to identify labels.

In addition, for example, in the combining layer, a plurality of values indicating the first and second features may be subjected to linear connection. As a result, the plurality of values indicating the plurality of features corresponding to the plurality of languages can be combined with each other through simple calculation. A result of the combining can be used to identify labels.

In addition, for example, in the combining layer, a probability of each of a plurality of labels may be calculated through a process including combining and weighted addition of a plurality of values indicating the first and second features. The labels identified by the common identification model 107 may be identified on the basis of the probabilities calculated in the combining layer.

As a result, final labels can be identified on the basis of the probabilities. In addition, the identification model 107 for identifying final labels from the two sets of text in the two languages is trained. Final labels can therefore be appropriately identified.

In addition, for example, third text and fourth text may be obtained. The third text is text in the first language, and the fourth text is text in the second language. Either the third text or the fourth text may be text obtained by translating the other text into the language corresponding to the foregoing text.

The third text and the fourth text may be input to the updated common identification model 107. Labels identified by the common identification model 107 from the third text and the fourth text may be identified as labels representing the third text or the fourth text.

As a result, both the third text in the first language and the fourth text in the second language are input to the identification model 107 based on the plurality of languages. The identification model 107 based on the plurality of languages can identify labels more appropriately than an identification model based on a single language or a combination of identification models based on a single language. Labels can therefore be appropriately identified.

In addition, for example, a first conversion model may convert the third text into a third value string, and a second conversion model may convert the fourth text into a fourth value string. The first conversion model converts a plurality of elements expressed in the first language into a plurality of close values when the plurality of elements are semantically close to one another. The second conversion model converts a plurality of elements expressed in the second language into a plurality of close values when the plurality of elements are semantically close to one another. The third text converted into the third value string and the fourth text converted into the fourth value string may be input to the common identification model 107.

As a result, the conversion model based on the meanings of the elements expressed in each language can convert the corresponding text into a value string and input the text converted into the value string to the common identification model 107.

In addition, for example, the first conversion model may convert the plurality of elements expressed in the first language into a plurality of close vectors when the plurality of elements are semantically close to one another. The second conversion model may convert the plurality of elements expressed in the second language into a plurality of close vectors when the plurality of elements are semantically close to one another. The third value string may be a third vector string. The fourth value string may be a fourth vector string.

As a result, the conversion model based on the meanings of the elements expressed in each language can convert the corresponding text into a vector string and input the text converted into the vector string to the common identification model 107.

In addition, an identification control apparatus 100 according to an aspect of the present disclosure includes a control circuit 110 that executes the method for controlling identification and a storage circuit 111 that stores information used by the control circuit 110 to execute the method for controlling identification. As a result, the identification control apparatus 100 can execute the method for controlling identification. The identification control apparatus 100, therefore, can appropriately identify labels representing the content of text in an environment in which a plurality of languages are used.

Although the identification control apparatus 100 and the method for controlling identification according to an aspect of the present disclosure have been described on the basis of the embodiment and the like, the present disclosure is not limited to the embodiment and the like. The present disclosure also includes modes obtained by modifying the embodiment and the like in ways conceivable by those skilled in the art and modes achieved by arbitrarily combining a plurality of components in the embodiment and the like.

For example, in the above embodiment, a process performed by a certain component may be performed by another component, instead. The order of a plurality of processes may be changed, or a plurality of processes may be performed in parallel with one another. In addition, translation performed need not be machine translation. In addition, a program may cause a computer to execute the method for controlling identification.

For example, the program causes a computer to execute a method for controlling identification. The method includes obtaining first text, which is text in a first language, obtaining second text, which is text in a second language obtained by translating the first text into the second language, obtaining correct labels, which represent content of the first text, inputting the first text and the second text to an identification model common to the first and second languages, and updating the common identification model such that labels identified by the common identification model from the first text and the second text match the correct labels.

In addition, the program may be stored in a non-transitory recording medium such as a CD-ROM. The identification control apparatus 100 may be achieved by an integrated circuit. The identification control apparatus 100 may include a plurality of electrical circuits or a plurality of units corresponding to the method for controlling identification, for example, as a plurality of hardware elements.

The present disclosure can be used in an identification control apparatus and the like for identifying labels representing the content of text in an environment in which a plurality of languages are used and can be applied to document identification systems, language analysis systems, dialog identification systems, document summarization system, and the like.

What is claimed is:

1. A method for controlling identification, the method comprising:
    obtaining first text, which is text in a first language, by an input/output circuit;
    obtaining second text, which is text in a second language obtained by electronically machine translating the first text into the second language by a processor;
    obtaining correct labels, by the processor, which represent content of the first text;
    inputting the first text and the second text to an identification model common to the first and second languages; and
    updating the common identification model by the processor such that labels identified by the common identification model from the first text and the second text match the correct labels,
    wherein the common identification model is a neural network model.

2. The method according to claim 1, further comprising:
    converting the first text into a first value string using a first conversion model, which converts a plurality of elements expressed in the first language into a plurality of close values when the plurality of elements are semantically close to one another; and
    converting the second text into a second value string using a second conversion model, which converts a plurality of elements expressed in the second language into a plurality of close values when the plurality of elements are semantically close to one another,
    wherein, in the inputting the first text and the second text to the identification model common to the first and second languages, the first text converted into the first value string and the second text converted into the second value string are input to the common identification model.

3. The method according to claim 2,
    wherein the first conversion model converts the plurality of elements expressed in the first language into a plurality of close vectors when the plurality of elements are semantically close to one another,
    wherein the second conversion model converts the plurality of elements expressed in the second language into a plurality of close vectors when the plurality of elements are semantically close to one another,
    wherein the first value string is a first vector string, and
    wherein the second value string is a second vector string.

4. The method according to claim 1,
    wherein the common identification model is a convolutional neural network model.

5. The method according to claim 4,
    wherein the convolutional neural network model includes a plurality of convolutional layers and a plurality of pooling layers alternately stacked on one another.

6. The method according to claim 4,
    wherein the convolutional neural network model separately includes at least one convolutional layer corresponding to the first language and at least one convolutional layer corresponding to the second language.

7. The method according to claim 4,
    wherein the convolutional neural network model separately includes at least one pooling layer corresponding to the first language and at least one pooling layer corresponding to the second language.

8. The method according to claim 4,
    wherein the convolutional neural network model includes at least one pooling layer common to the first and second languages.

9. The method according to claim 4,
    wherein the convolutional neural network model includes at least one convolutional layer common to the first and second languages.

10. The method according to claim 1,
    wherein the common identification model is a recurrent neural network model.

11. The method according to claim 1,
    wherein the common identification model includes
    a first extraction layer in which a first feature, which is a feature of text in the first language, is extracted,
    a second extraction layer in which a second feature, which is a feature of text in the second language, is extracted, and
    a combining layer in which the first feature and the second feature are combined with each other.

12. The method according to claim 11,
    wherein, in the combining layer, a plurality of values indicating the first and second features are connected with each other.

13. The method according to claim 11,
    wherein, in the combining layer, a plurality of values indicating the first and second features are subjected to linear connection.

14. The method according to claim 11,
    wherein, in the combining layer, a probability of each of a plurality of labels is calculated through a process including combining and weighted addition of a plurality of values indicating the first and second features, and
    wherein the labels identified by the common identification model are identified on the basis of the probabilities calculated in the combining layer.

15. The method according to claim 1, further comprising:
    obtaining third text, which is text in the first language;
    obtaining fourth text, which is text in the second language, either the third text or the fourth text being text obtained by translating the other text into the language corresponding to the foregoing text;
    inputting the third text and the fourth text to the updated common identification model; and identifying labels identified by the common identification model from the third text and the fourth text as labels representing the third text or the fourth text.

16. The method according to claim 15, further comprising:
converting the third text into a third value string using a first conversion model, which converts a plurality of elements expressed in the first language into a plurality of close values when the plurality of elements are semantically close to one another; and
converting the fourth text into a fourth value string using a second conversion model, which converts a plurality of elements expressed in the second language into a plurality of close values when the plurality of elements are semantically close to one another,
wherein, in the inputting the third text and the fourth text to the updated common identification model, the third text converted into the third value string and the fourth text converted into the fourth value string are input to the common identification model.

17. The method according to claim 16,
wherein the first conversion model converts the plurality of elements expressed in the first language into a plurality of close vectors when the plurality of elements are semantically close to one another,
wherein the second conversion model converts the plurality of elements expressed in the second language into a plurality of close vectors when the plurality of elements are semantically close to one another,
wherein the third value string is a third vector string, and
wherein the fourth value string is a fourth vector string.

18. An identification control apparatus comprising:
a controller, including a processor, configured to execute operations for controlling identification; and
a storage that stores information used by the controller to execute the operations, the operations including
obtaining first text, by an input output circuit, which is text in a first language;
obtaining second text, which is text in a second language obtained by electronically machine translating the first text into the second language;
obtaining correct labels, which indicate content of the first text;
inputting the first text and the second text to an identification model common to the first and second languages; and
updating the common identification model such that labels identified by the common identification model from the first text and the second text match the correct labels,
wherein the common identification model is a neural network model.

* * * * *